United States Patent
Matson et al.

(10) Patent No.: US 6,564,239 B2
(45) Date of Patent: May 13, 2003

(54) COMPUTER METHOD AND APPARATUS FOR DIVISION AND SQUARE ROOT OPERATIONS USING SIGNED DIGIT

(75) Inventors: Mark D. Matson, Acton, MA (US); Robert J. Dupcak, Framingham, MA (US); Jonathan D. Krause, Marlboro, MA (US); Sridhar Samudrala, Westboro, MA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 10/016,902

(22) Filed: Dec. 14, 2001

(65) Prior Publication Data

US 2002/0143839 A1 Oct. 3, 2002

Related U.S. Application Data

(62) Division of application No. 09/294,597, filed on Apr. 20, 1999, now Pat. No. 6,360,241
(60) Provisional application No. 60/118,130, filed on Feb. 1, 1999, and provisional application No. 60/119,959, filed on Feb. 12, 1999.

(51) Int. Cl.[7] .............................. G06F 7/38; G06F 7/50
(52) U.S. Cl. ....................... 708/605; 708/650
(58) Field of Search ..................... 708/650, 653–656, 708/493, 605

(56) References Cited

U.S. PATENT DOCUMENTS

| | | |
|---|---|---|
| 4,725,974 A | 2/1988 | Kanazawa |
| 4,797,849 A | 1/1989 | Nakano |
| 4,939,686 A * | 7/1990 | Fandrianto .................. 708/605 |
| 5,046,038 A | 9/1991 | Briggs et al. |
| 5,065,352 A | 11/1991 | Nakano |
| 5,105,378 A | 4/1992 | Mori .......................... 708/650 |
| 5,128,891 A * | 7/1992 | Lynch et al. ................. 708/605 |

(List continued on next page.)

OTHER PUBLICATIONS

Koren, Isreal, "Computer Arithmetic Algorithm", Prentice Hall, N.J., ch. 7–8, pp 127–161.
Burgess, N., "A Fast Division Algorithm for VLSI", Department of Electrical Engineering and Electronics, Uxbridge, U.K.: Brunel University (1991).
Ren, H., et al., "Design of a 16–bit CMOS Divider/Square-Root Circuit," IEEE Department of electrical Engineering, College of Engineering, San Jose State University, San Jose, CA, 807–811 (1993).
Ciminiera, L. and Montuschi, P., "Higher Radix Square Rooting," *IEEE Transactions on Computers* 39(10) : 1220–1231 (Oct. 1990).
Montuschi, P. and Ciminiers, L., "On the Efficient Implementation of Higher Radix Square Root algorithms," *Dipartimento di Automatica e Informatica, corso Duca degli Abruzzi 24, 10129 Torino (Italy), Prodeedings of 9th Symposium on Computer Arithmetic*, 154–161 (1989).

*Primary Examiner*—Tan V. Mai
(74) *Attorney, Agent, or Firm*—Hamilton, Brook, Smith & Reynolds, P.C.

(57) ABSTRACT

Computer method and apparatus for performing a square root or division operation generating a root or quotient is presented. A partial remainder is stored in radix-2 or radix-4 signed digit format. A decoder is provided for computing a root or quotient digit, and a correction term dependent on a number of the most significant digits of the partial remainder. An adder is provided for computing the sum of the signed digit partial remainder and the correction term in binary format, and providing the result in signed digit format. The adder computes a carry out independent of a carry in bit and a sum dependent on a Carry_in bit providing a fast adder independent of carry propagate delays. The scaler performs a multiplication by two of the result output from the adder in signed digit format to provide a signed digit next partial remainder.

48 Claims, 12 Drawing Sheets

U.S. PATENT DOCUMENTS

| | | | |
|---|---|---|---|
| 5,365,471 A | 11/1994 | Sato | 708/653 |
| 5,404,324 A | 4/1995 | Colon-Bonet | 708/650 |
| 5,467,299 A | 11/1995 | Sato et al. | 708/650 |
| 5,537,345 A * | 7/1996 | Nakano | 708/605 |
| 5,787,030 A * | 7/1998 | Prabhu et al. | 708/605 |
| 5,798,955 A * | 8/1998 | Matsubara | 708/605 |
| 6,108,682 A * | 8/2000 | Matheny | 708/605 |

* cited by examiner

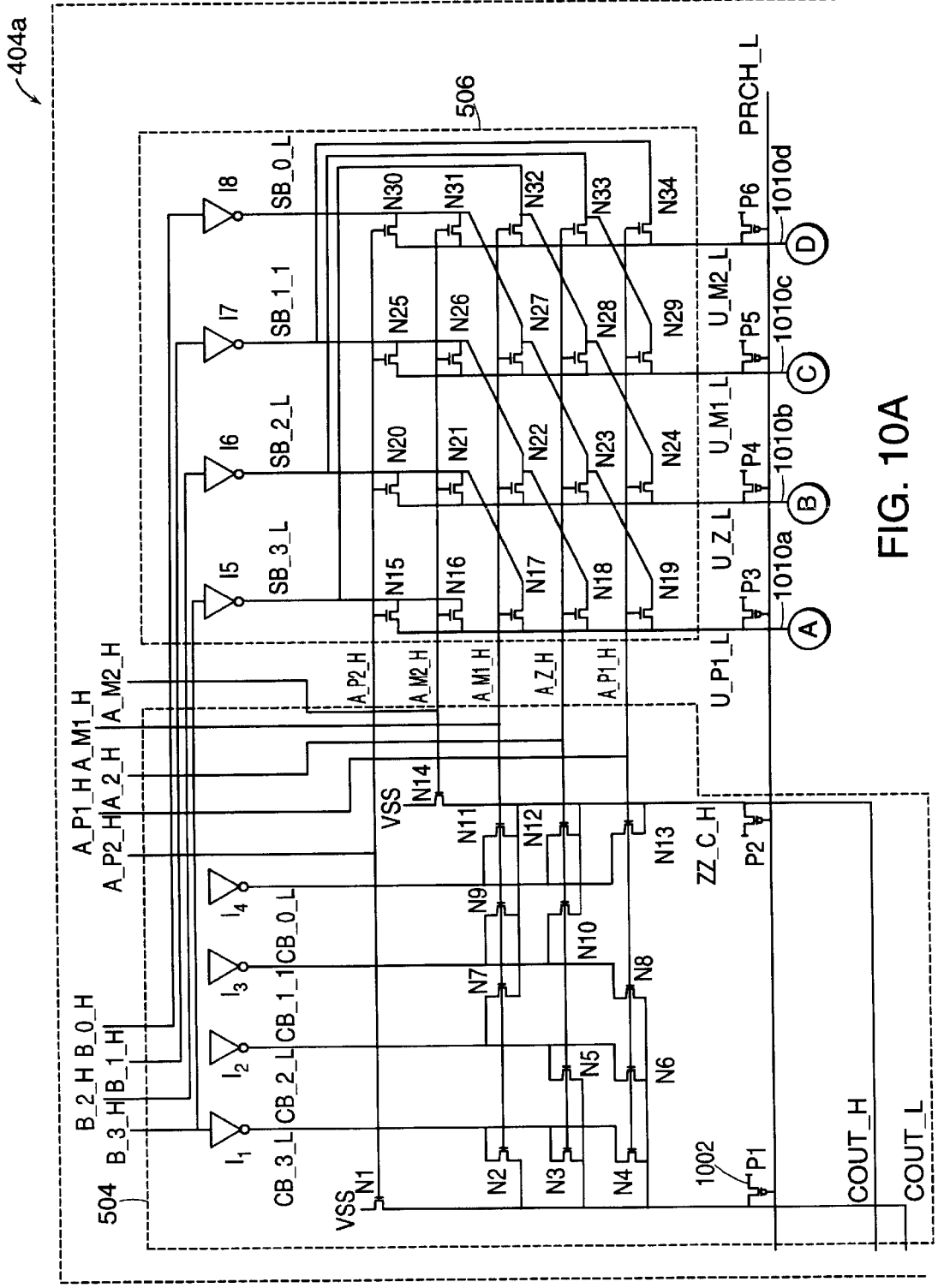

COMPUTER METHOD AND APPARATUS FOR DIVISION AND SQUARE ROOT OPERATIONS USING SIGNED DIGIT

RELATED APPLICATIONS

This application is a divisional of U.S. application Ser. No. 09/294,597, filed Apr. 20, 1999 now U.S. Pat. No. 6,560,241, which claims the benefit of U.S. Provisional Application No. 60/118,130 filed on Feb. 1, 1999 entitled "A Generalized Push-Pull Cascode Logic Technique" by Mark Matson et al. and U.S. Provisional Application No. 60/119,959 filed on Feb. 12, 1999 entitled "Methods For Adding Signed Digit and Binary Numbers and a Method For Doubling a Signed Digit Number" by Mark Matson et al., the entire teachings of which are hereby incorporated by reference.

BACKGROUND OF THE INVENTION

Generally mathematical operations in a computer such as, (i) division of a dividend by a divisor to produce a quotient and (ii) square root of a radic and to produce a root, are slow. Such division and square root operations are slow because they require iteratively generating a series of partial remainders, and quotient or root digits respectively.

Therefore, the speed of the division or square root operation is dependent on the amount of time it takes to complete one iteration and the total number of iterations required. The total number of iterations is dependent on the number of quotient or root mantissa digits required to provide an accurate quotient or root. For example, in floating point division twenty-four mantissa digits are required for single precision and fifty-three mantissa digits are required for double-precision, therefore the time required to generate each of the required quotient digits is critical to the speed of the division operation.

Typically, in each iteration of a square root operation, a root digit and a correction term are computed after examining a current partial remainder. The succeeding or partial remainder for the next iteration is computed by subtracting the correction term from the current partial remainder and scaling the result of the subtraction. In each iteration of a division operation, a quotient digit is computed after comparing a current partial remainder and the divisor. The partial remainder for the next iteration is computed by subtracting a multiple of the divisor from the current partial remainder and scaling the result of the subtraction.

Thus, the computation of the partial remainder for the next iteration for both the square root operation and the division operation requires a subtraction operation. Typically the subtraction is performed through the use of Carry Propagate Adders ("CPA") or Carry Save Adders ("CSA"). CPAs are relatively slow because a carry bit must be propagated from the Least Significant Bit ("LSB") CPA to the Most Significant Bit ("MSB") CPA. CSAs are much faster but because they present the partial remainder as separate sum and carry binary numbers which must be added, examination of the partial remainder is slower and more complicated.

The tradeoff between examination speed and subtraction speed (CPA and CSAs) is a long standing issue faced by computer divider and square root designers.

SUMMARY OF THE INVENTION

In a computer system, a next partial remainder and an output digit is determined by a decoder coupled to an adder, the adder coupled to a scaler. The decoder computes the root digit and binary correction term dependent on a number of digits of a partial remainder. The partial remainder is stored in signed digit format. The adder generates a signed digit result by subtracting the binary correction term from the signed digit partial remainder. The scaler computes the next partial remainder dependent on the signed digit result from the adder.

The signed digit values are selected from a set of digit values. The adder computes a carry out bit independent of the carry in bit. The scaler computes the next signed digit partial remainder by scaling the current signed digit partial remainder upward.

In a computer system, a mathematical square root operation is performed by a decoder coupled to an adder, the adder coupled to a scaler. The decoder computes the root digit and binary correction term dependent on a number of digits of a partial remainder. The partial remainder is stored in signed digit format. The adder generates a signed digit result by subtracting the binary correction term from the signed digit partial remainder. The scaler computes the next partial remainder dependent on the signed digit result from the adder.

The signed digit values are selected from a set of digit values. The set of digit values may be minus one, zero or one, or minus two, minus one, zero, plus one and plus two or any other set of digit values containing more than two digit values. The adder computes a carry out bit independent of the carry in bit. The output signals in the adder may be initialized to predetermined voltage levels. The scaler computes the next signed digit partial remainder by scaling the current signed digit remainder upward.

In a computer system, a mathematical division operation is performed by a decoder coupled to an adder, the adder coupled to a scaler. The decoder computes the quotient digit and binary correction term dependent on a number of digits of a partial remainder. The partial remainder is stored in signed digit format. The adder generates a signed digit result by subtracting the binary correction term from the signed digit partial remainder. The scaler computes the next partial remainder dependent on the signed digit result from the adder.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 10A–B are a schematic of yet another embodiment of any of the signed digit adders shown in FIG. 4.

DETAILED DESCRIPTION OF THE INVENTION

Figure 1:
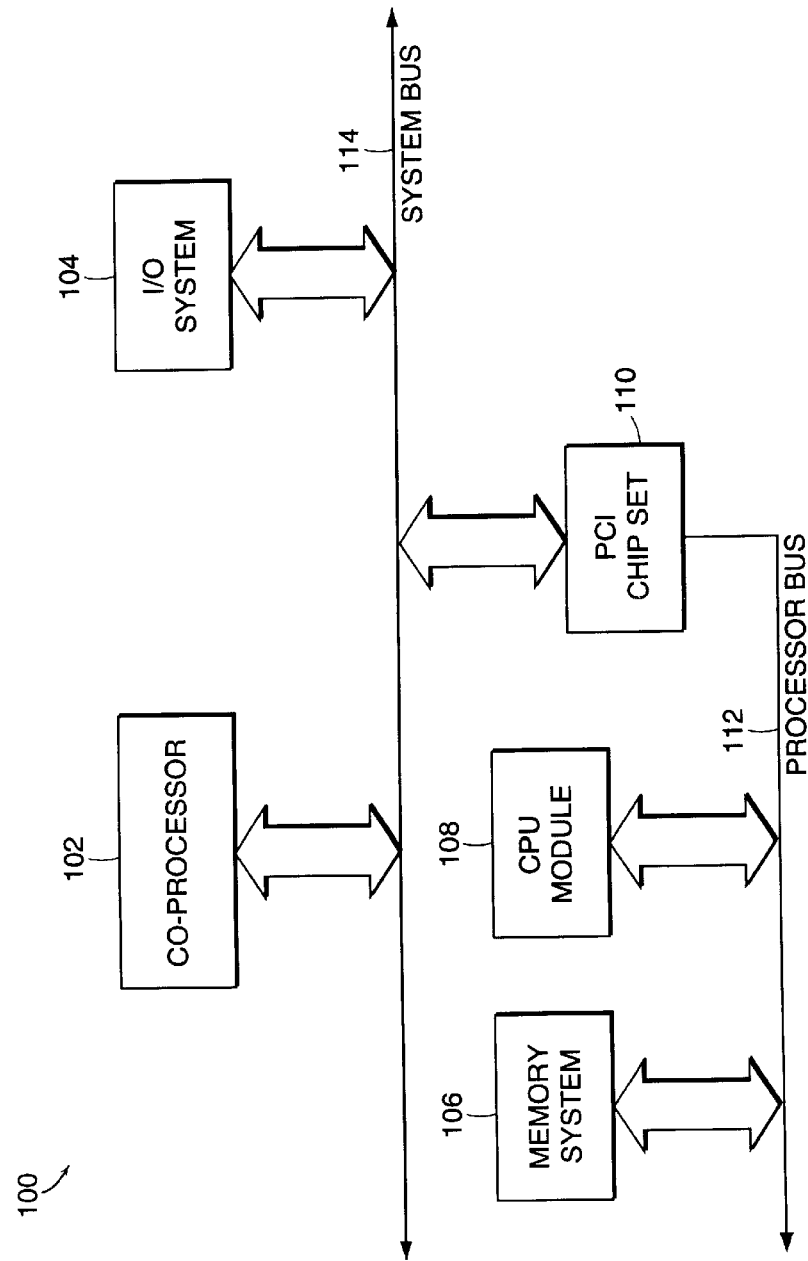
FIG. 1 is a block diagram of a computer system in which the present invention may be used.

FIG. 1 is a block diagram of a typical computer system 100 in which the present invention is utilized. Included in the computer system 100 are a Central Processing Unit ("CPU") module 108, a memory system 106 and a PCI chip set 110 connected by a processor bus 112. The PCI chip set 110 is further connected to an Input/Output ("I/O") system 104 and a co-processor module 102 by a system bus 114.

Figure 2:
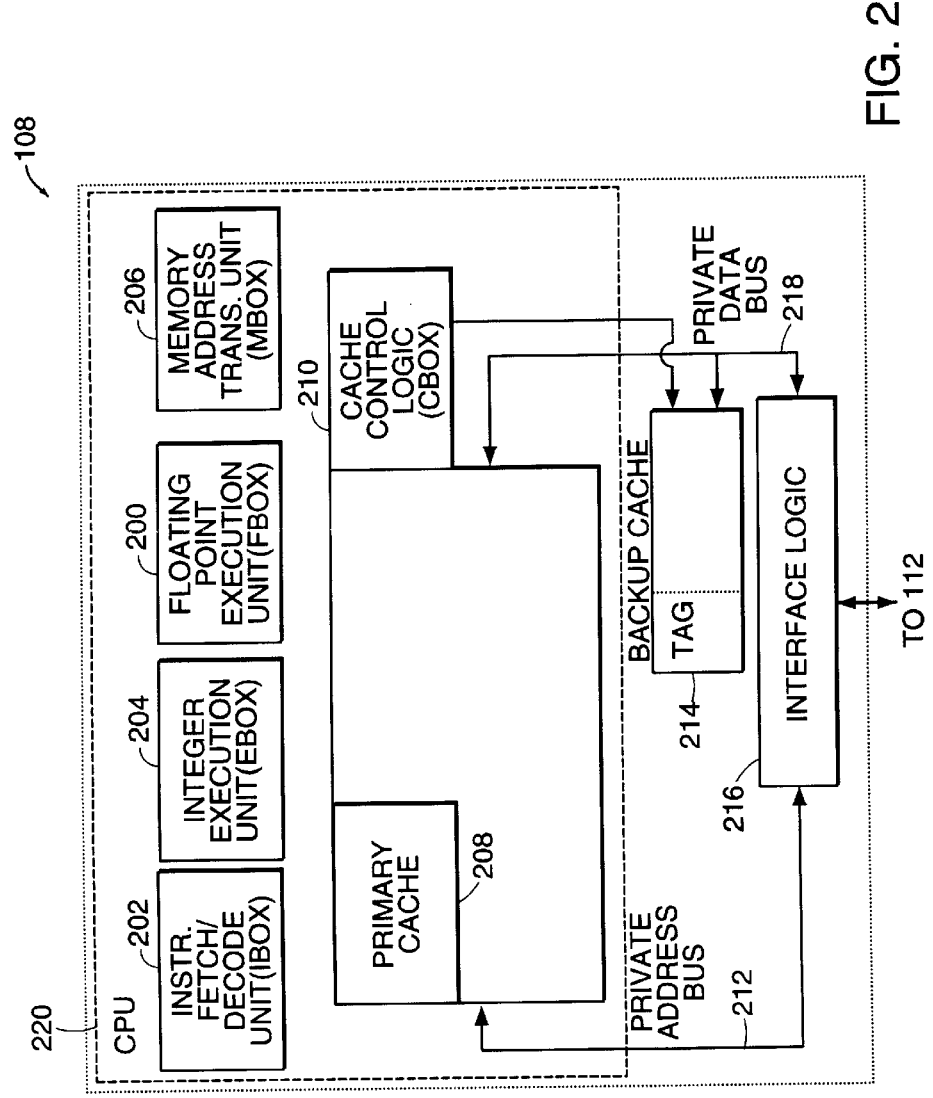
FIG. 2 is a block diagram of the CPU module shown in FIG. 1.

FIG. 2 shows the CPU module 108 shown in FIG. 1. The CPU module 108 includes a CPU 220, a backup cache 214 and a processor bus interface logic 216 connected by a private address bus 212 and a private data bus 218. The processor bus interface logic 216 connects the CPU module 108 to the processor bus 112(FIG. 1). The CPU 220 includes a primary cache 208 and a cache control (CBOX) logic 210. The cache control logic (CBOX) 210 controls the primary cache 208 in the CPU 220 and the backup cache 214.

CPU 220 further includes logic circuits to enable it to perform operations for the computer system 100. An Instruction Fetch and Decode Unit (IBOX) 202 performs instruction prefetch, decode, branch prediction, instruction issuance and interrupt handling operations. An Integer Execution Unit (EBOX) 204 performs mathematical operations on integer values such as, addition, shifting, byte manipulation, and multiplication. A Floating Point Execution Unit (FBOX) 200 performs mathematical operations on floating point values such as, square root, division and multiplication. A Memory Management Unit (MBOX) 206 performs memory address translation, for example, from virtual memory addresses to physical memory addresses.

Figure 3:
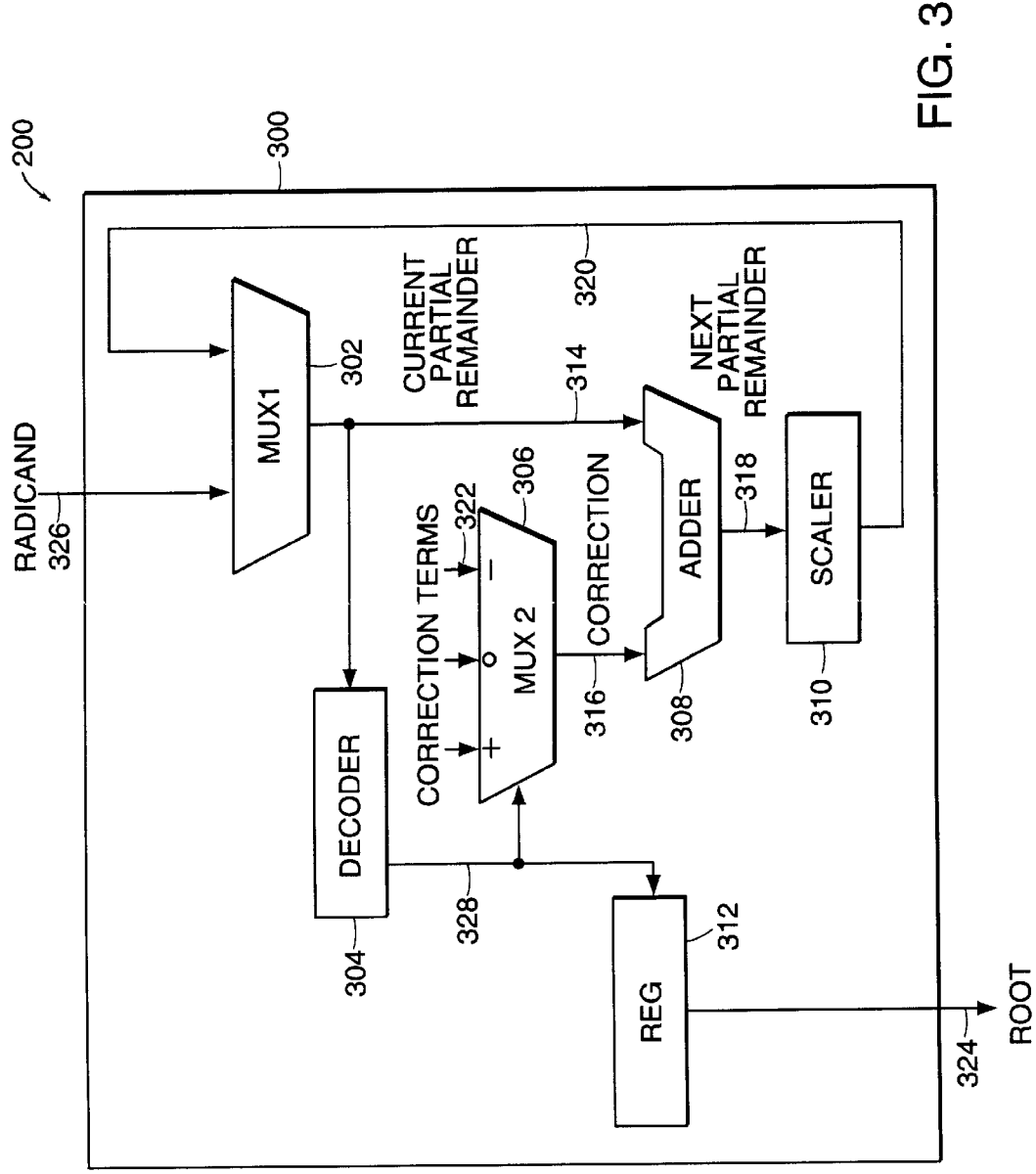
FIG. 3 is a block diagram of the floating point square root operation in the FBOX shown in FIG. 2.

FIG. 3 shows a block diagram of a square root unit 300 located in the Floating Point Execution Unit (FBOX) 200 shown in FIG. 2. The square root unit 300 computes a root 324 for a radicand 326, by computing one root digit 328 per iteration. In each iteration of the square root unit 300, a root digit 328 is computed in the decoder 304 dependent on a current partial remainder 314, and a correction term 316 is computed in the multiplexor 306. A succeeding or next partial remainder 320 is computed by adding the correction term 316 to the current partial remainder 314 in an adder 308, and scaling the result of the addition 318 in a scaler 310.

The time taken for each iteration is dependent on the sum of the speed of each of the decoder 304, the adder 308 and the scaler 310. To provide a fast decode, the current partial remainder 314 is represented in signed digit format. The signed digit format may consist of values selected from the radix-2 set of signed digits {−1, 0, 1} or the radix-4 set of signed digits {−2, −1, 0, 1, 2} or any other set of signed digits. Representing the current partial remainder 314 in signed digit format, a redundant format, allows the current partial remainder 314 to be examined quickly in the decoder 304. In particular, decoder 304 uses the sign of the most significant non-zero digit, as the sign of the overall current partial remainder 314. For example, if the four MSBs of the current partial remainder 314 are set to the signed digit values 0, −1, 1, −1, the current partial remainder 314 is negative because the most significant non-zero digit is −1. Accordingly, using signed digit representation reduces the complexity of examining partial remainder 314, in comparison to methods employing CSAs, where carry and sum vectors must be combined. In turn, the reduced complexity of the examination reduces the total time and thus increases the overall speed of the decoder 304.

The number of digits required to be examined by decoder 304 is a function of the correction term's 316 ability to add or subtract from the current partial remainder 314. Thus, while the preferred embodiment with digit values selected from the radix-2 set {−1, 0, 1}, requires the four most significant bits of the current partial remainder 314 to be examined less than four bits may be required in other embodiments.

Continuing with FIG. 3 the square root unit 300 includes a correction multiplexor 306. The correction multiplexor 306 selects the correction term 316 for the current iteration dependent on the input correction terms 322 and the root digit 328.

To provide a fast adder 308, the adder 308 adds the correction term 316 in binary format to the current partial remainder 314 in signed digit format. The result of the addition 318 is in signed digit format. The carry value is determined in a manner such that the carry out from a bit position does not depend on the carry in received from the output of the previous, lower order, bit position. This is achieved by satisfying the following equation, for each bit position, in the case with the current partial remainder 314 in signed digit format with digit values selected from the set {−1, 0, 1}:

$$2*C_{out}+S_{out}=A+B+C_{in}$$

where

A=value of the current partial remainder 314 for the given bit position.

B=value of the correction term 316, for the given bit position.

$C_{in}$=value of the Carry_In, for the given bit position.

$C_{out}$=value of the Carry_Out, for the given bit position.

$S_{out}$=value of the Sum_Out, for the given bit position.

Table 1 below shows the result of the radix-2 addition using the above equation. An embodiment of the present invention implementing the above equation is described in conjunction with FIGS. 5–9.

TABLE 1

| $C_{in}$ = 0 | | | | $C_{in}$ = 1 | | | |
|---|---|---|---|---|---|---|---|
| A | B | $C_{out}$ | $S_{out}$ | A | B | $C_{out}$ | $S_{out}$ |
| −1 | 0 | 0 | −1 | −1 | 0 | 0 | 0 |
| −1 | 1 | 0 | 0 | −1 | 1 | 0 | 1 |
| 0 | 0 | 0 | 0 | 0 | 0 | 0 | 1 |
| 0 | 1 | 1 | −1 | 0 | 1 | 1 | 0 |
| 1 | 0 | 1 | −1 | 1 | 0 | 1 | 0 |
| 1 | 1 | 1 | 0 | 1 | 1 | 1 | 1 |

In the case of a current partial remainder 314 in signed digit format with digit values selected from the set {−2, −1, 0, 1, 2}, the following equation is satisfied in the adder 308:

$$4*C_{out}+S_{out}=A+B+C_{in}$$

Table 2 below shows the result of the radix-4 addition using the above equation in adder 308. An embodiment of the present invention implementing the above equation is described in conjunction with FIGS. 5 and 10.

TABLE 2

| | $C_{in} = 0$ | | | | | | | |
|---|---|---|---|---|---|---|---|---|
| | B = 00 | | B = 01 | | B = 10 | | B = 11 | |
| A | $C_{out}$ | $S_{out}$ | $C_{out}$ | $S_{out}$ | $C_{out}$ | $S_{out}$ | $C_{out}$ | $S_{out}$ |
| −2 | 0 | −2 | 0 | −1 | 0 | 0 | 0 | 1 |
| −1 | 0 | −1 | 0 | 0 | 0 | 1 | 1 | −2 |
| 0 | 0 | 0 | 0 | 1 | 1 | 2 | 1 | −1 |
| 1 | 0 | 1 | 1 | −2 | 1 | −1 | 1 | 0 |
| 2 | 1 | −2 | 1 | −1 | 1 | 0 | 1 | 1 |

| | $C_{in} = 0$ | | | | | | | |
|---|---|---|---|---|---|---|---|---|
| | B = 00 | | B = 01 | | B = 10 | | B = 11 | |
| A | $C_{out}$ | $S_{out}$ | $C_{out}$ | $S_{out}$ | $C_{out}$ | $S_{out}$ | $C_{out}$ | $S_{out}$ |
| −2 | 0 | −1 | 0 | 0 | 0 | 1 | 0 | 2 |
| −1 | 0 | 0 | 0 | 1 | 0 | 2 | 1 | −1 |
| 0 | 0 | 1 | 0 | 2 | 1 | −1 | 1 | 0 |
| 1 | 0 | 2 | 1 | −1 | 1 | 0 | 1 | 1 |
| 2 | 1 | −1 | 1 | 0 | 1 | 1 | 1 | 2 |

Thus the increased speed of the adder 308 is enabled by use of the predetermined values of the foregoing tables. The scaler 310 generates the next partial remainder 320 by scaling the result of the addition 318 upward. With respect to scaler 310, the scaler 310 multiplies the result of the addition 318 by a multiplication factor dependent on the set of correction terms used to reduce the partial remainder. The embodiments described in conjunction with FIGS. 6, 9, 10 and 11 use a multiplication factor of two; other factors may be used. Multiplying the result of a radix-2 addition 318 by two involves scaler 310 shifting the result of the addition 318 by one digit to generate the next partial remainder 320. Multiplying the result of a radix-4 addition 318 by two is described in conjunction with FIG. 11.

Continuing with FIG. 3 the square root unit 300 includes a first multiplexor 302. The first multiplexor 302 selects the radicand 326 in binary format as the current partial remainder 314 for the first iteration. In subsequent iterations the next partial remainder 320 is selected as the current partial remainder 314. The correction multiplexor 306 selects the correction term 316 for the current iteration dependent on the input correction terms 322 and the root digit 328.

The square root unit 300 described in conjunction with FIG. 3 may be used in any operations requiring the iterative generation of partial remainders such as, cube roots and square roots. For example, the square root unit 300 may be used to perform a division operation by computing quotient digits in each cycle instead of root digits. To convert the square root unit 300 to a divider, the radicand 326 is replaced by a dividend, the correction terms 322 are replaced by divisor terms, quotient digits are stored in the register 312 and the resulting root 324 is replaced by a quotient.

Figure 4:
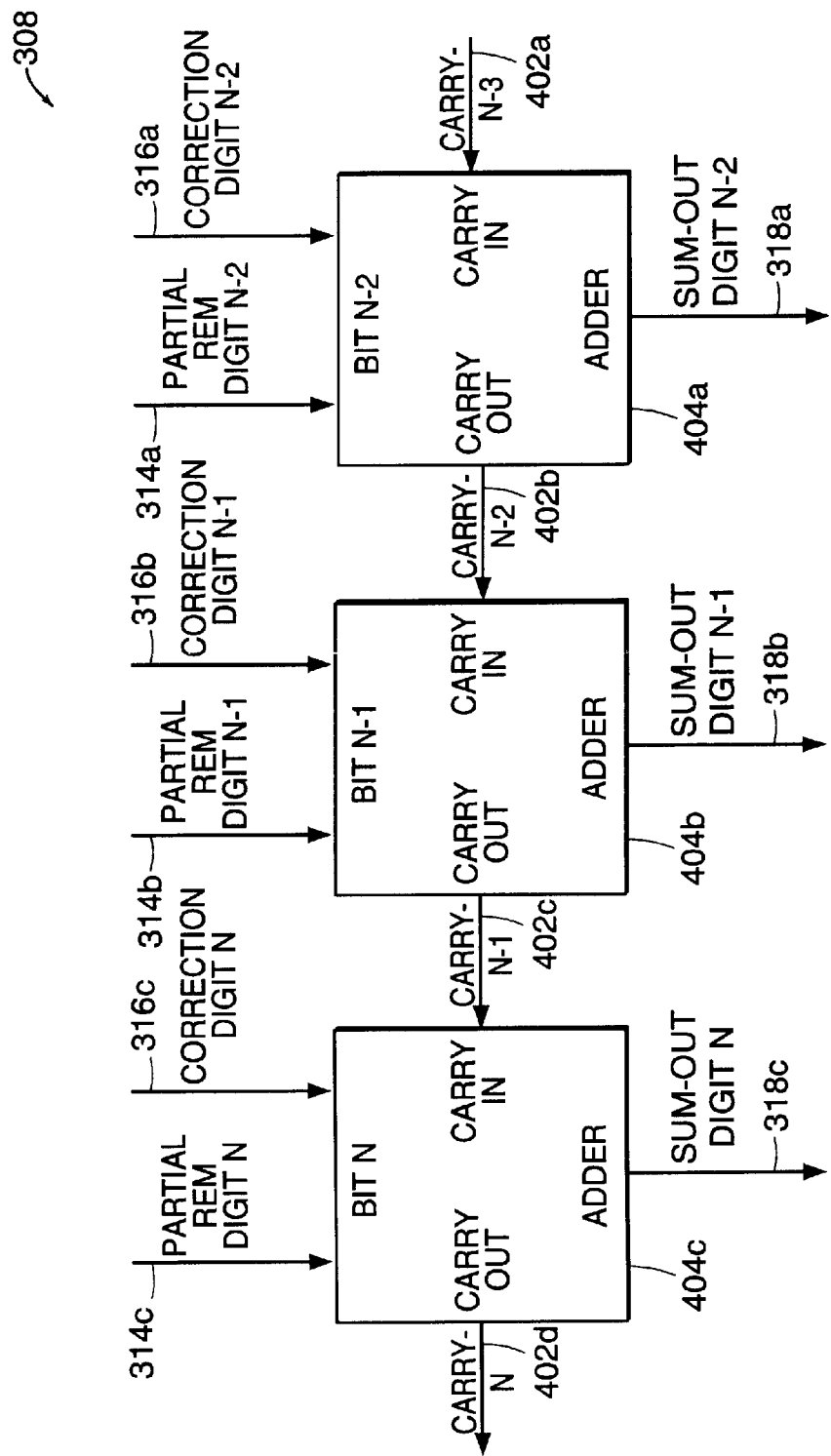
FIG. 4 is a block diagram of the adder shown in FIG. 3 showing a number of identical signed digit adders.

FIG. 4 shows details of the adder 308 of FIG. 3 including an array of signed digit adders 404*a–c*. The number of signed digit adders 404*a–c* is not limited to the three shown in FIG. 4, but rather is dependent on the total number of bits (N) of the correction term 316 and the number of bits (N) of current partial remainder 314 to be subtracted in the adder 308. Each signed digit adder 404*a–c* has three inputs and two outputs. The inputs include the signed digit of the correction term 316*a–c*, signed digit of the current partial remainder 314*a–c* and a Carry__In bit 402*a–c*. The Carry__In bit 402*a–c* is the Carry__Out bit 402*a–c* from the adjacent lower order signed digit adder 404*c* as illustrated by the horizontal chained arrows in FIG. 4. The outputs include the result of the addition 318*a–c* and the Carry__Out bit 402*b–d* to be input to the adjacent higher order bit signed digit adder 404*b–c*.

Figure 5:
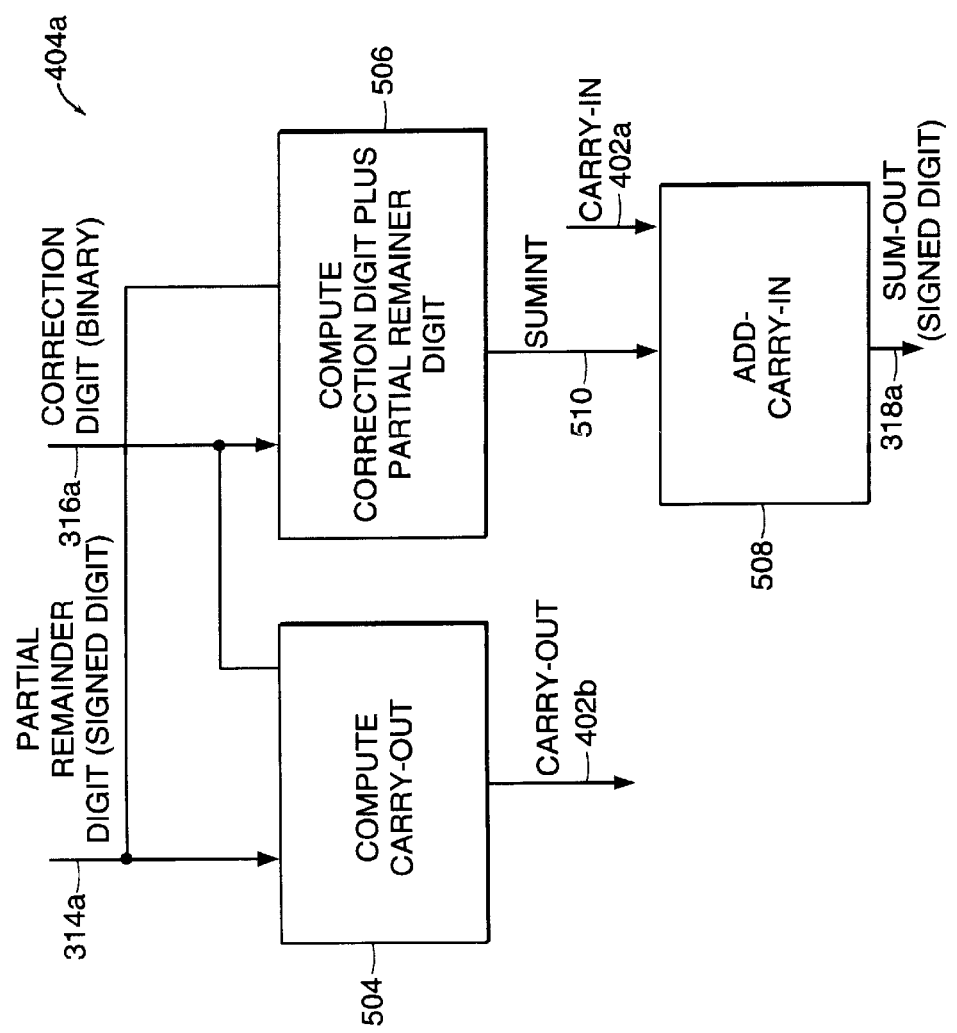
FIG. 5 is a block diagram of any of the signed digit adders shown in FIG. 4.

FIG. 5 shows an embodiment of the signed digit adder 404*a* shown in FIG. 4. The current partial remainder 314*a* s in signed digit format with digit values selected from the radix-2 set $\{-1, 0, 1\}$ or the radix-4 set $\{-2, -1, 0, 1, 2\}$. The signed digit adder 404*a* adds a current partial remainder 314*a* in signed digit format to a correction term digit 316*a* in binary format and outputs the result of the addition bit 318*a* in signed digit format. The signed digit adder 404*a* includes a compute carry-out logic 504, a Correction__plus-PR logic 506 and an Add__Carry__In logic 508.

The Compute__Carry__Out logic 504 computes the Carry__Out bit 402*b* dependent on the current partial remainder digit 314*a* and the correction term digit 316*a*. The Carry__Out bit 402*b* is independent of the Carry__In bit 402*a,* and therefore Compute__Carry__Out logic 504 differs from a signed digit adder in a CPA, in which the Carry__Out bit is dependent on the Carry__In bit from the previous signed digit adder. The Carry__Out bit 402*b* is computed in parallel with the SumInt 510. Therefore the adder does not have to wait for a carry to propagate as in the case of a CPA adder. The Carry__In bit 402*a* is added to the SumInt 510 and the Sum__Out digit 318*a* is output from the adder. Further Carry__Out bit 402*b* is available as a Carry__In bit 402*a* to provide the Sum__Out digit 318*b* in a succeeding adder 404*b*. Therefore the Carry__Out bit 402*b* does not have to be added later, as in the case of a CSA adder The Correction__plus__PR logic 506 computes the sum of the correction term digit 316*a* and the current partial remainder digit 314*a* and outputs the SumInt 510 in decoded format. The Add__Carry__In logic 508 adds the SumInt 510 and the Carry__In bit 402*a* from the previous signed digit adder 404 and outputs a Sum__Out digit 318*a* in signed digit format.

Figure 6:
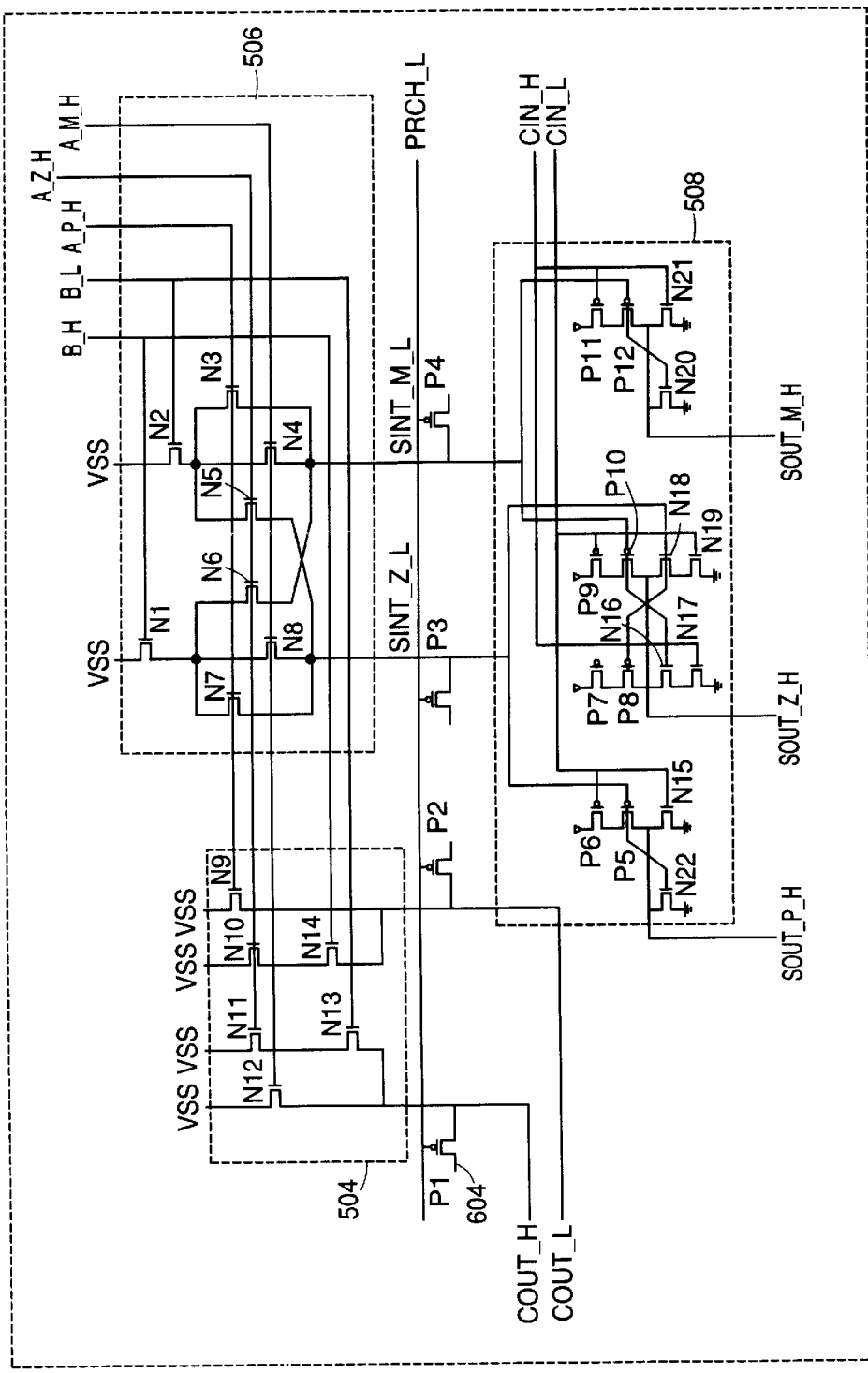
FIG. 6 is a schematic of one embodiment of the present invention employing the adder of FIG. 5.

FIG. 6 shows a schematic for one embodiment of the signed digit adder 404*a* shown in FIG. 5, according to the principles of the present invention. The current partial remainder digit 314*a* is in signed digit format with digit values selected from the set $\{-1, 0, 1\}$. The Sum__Out digit 318*a* is also in signed digit format with digit values selected from the set $\{-1, 0, 1\}$. The operation of the schematic is described in conjunction with the timing diagram in FIG. 7 and Tables 3, 4 and 5 below.

The schematic includes NMOS and PMOS transistors. Each of the NMOS and PMOS transistors include a gate, source and drain. The NMOS and PMOS transistors act as "ON-OFF" switches. An NMOS transistor is turned "ON" by applying a high voltage level '1' to the gate relative to the source. A PMOS transistor is turned "ON" by applying a low voltage level '0' to the gate relative to the source. NMOS transistors are labeled N and PMOS transistors are labeled P in the schematics shown in FIGS. 6, 10 and 11.

The schematic of FIG. 6 includes the blocks, Correction__plus__PR logic 506, Add__Carry__In logic 508 and Compute__Carry__Out logic 504 discussed in FIG. 5. The SumInt 510, Sum__Out digit 318*a,* current partial remainder digit 316*a,* correction term digit 316*a,* Carry__Out bit 402*b* and Carry__In bit 402*a* shown in FIG. 5 are divided into separate signals in FIG. 6 as follows:

The current partial remainder digit 314*a* in FIG. 5 in signed digit format corresponds to the A__P__H, A__Z__H and A__M__H signals in FIG. 6. The correction term digit 316*a* shown in FIG. 5 in binary format corresponds to the B__H and the B__L signals in FIG. 6. The Carry__Out bit 402b shown in FIG. 5 in binary format corresponds to the COUT_H and the COUT_L signals in FIG. 6. The Sum_Out digit 318a in FIG. 5 in signed digit format corresponds to the SOUT_P_H, SOUT_Z_H and SOUT_M_H signals in FIG. 6. The Carry_In bit 402a in FIG. 5 in binary format corresponds to the CIN_H and the CIN_L signals in FIG. 6. The Sum_Int bits 510 in FIG. 5 corresponds to the SINT_Z_L and SINT_M_L signals.

In the preferred embodiment, the COUT_H, COUT_L, SOUT_P_H, SOUT_Z_H and SOUT_M_H signals are set to pre-defined voltage levels. The PRCH_L signal sets the voltage levels through PMOS transistors P1–P4. In the timing diagram in FIG. 7 the PRCH_L signal is set to a low voltage level '0' during a precharge cycle 724. Output signals COUT_H and COUT_L are precharged to a high voltage level '1'. Output signals SOUT_P_H, SOUT_Z_H and SOUT_M_H are precharged to a low voltage level '0'.

The operation of the precharge cycle 724 is described for the COUT_H signal in the schematic shown in FIG. 6. The PRCH_L signal is initially set to a low voltage level '0'. The PRCH_L signal is connected to the gate of P1. P1 is a PMOS transistor and turns "ON" when a low voltage level '0' is applied to the gate. The P1's source 604 is connected to a high voltage level '1', and the high voltage level '1' is applied to P1's drain which is connected to the COUT_H signal when P1 is turned "ON".

The Carry_Out logic 504 includes NMOS transistors labeled N9–N14. The Carry_Out logic 504 conditionally sets the COUT_H and COUT_L signals to a low voltage level '0' dependent on the voltage levels of the A_P_H, A_Z_H, A_M_H, B_H and B_L signals as shown in Table 3 below.

TABLE 3

| Partial Remainder | | | Correction Term | | Carry_Out | |
|---|---|---|---|---|---|---|
| A_P_H | A_Z_H | A_M_H | B_H | B_L | COUT_H | COUT_L |
| 0 | 0 | 1 | 0 | 1 | 0 | 1 |
| 0 | 0 | 1 | 1 | 0 | 0 | 1 |
| 0 | 1 | 0 | 0 | 1 | 0 | 1 |
| 0 | 1 | 0 | 1 | 0 | 1 | 0 |
| 1 | 0 | 0 | 0 | 1 | 1 | 0 |
| 1 | 0 | 0 | 1 | 0 | 1 | 0 |

Figure 7:
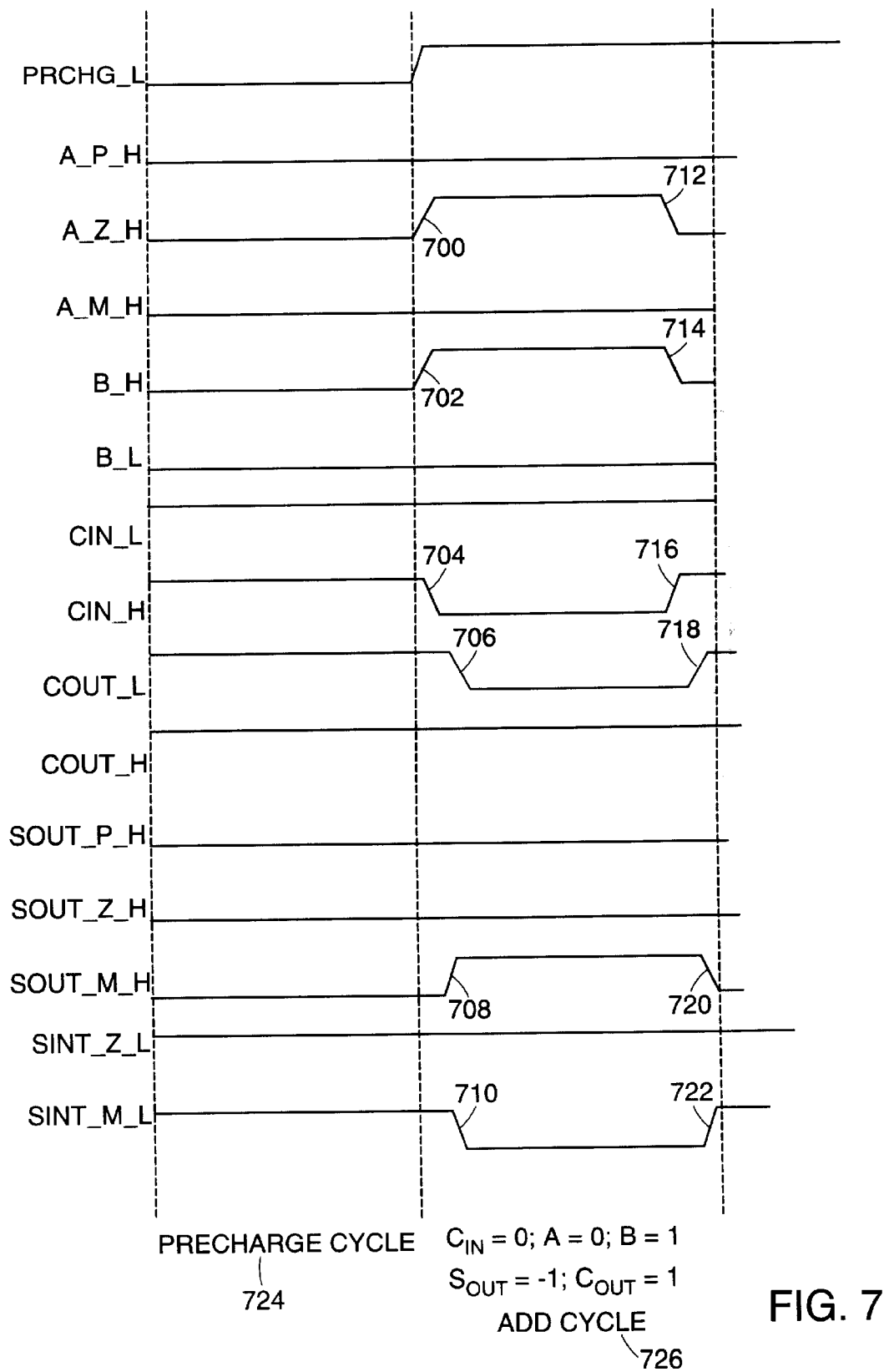
FIG. 7 is a timing diagram for the embodiment shown in FIG. 6.

The operation of the Carry_Out logic 504 is described for the case with current partial remainder digit 314a set to logic level '0' and correction term digit 316a set to logic level '1' in conjunction with FIG. 6 and the Add_Cycle 726 in FIG. 7. To set current partial remainder digit 314a to logic level '0' the A_Z_H signal is set to a high voltage level '1' as shown at voltage level transition 700 in Add_Cycle 726 in FIG. 7. In the schematic shown in FIG. 6 the gate of N10 is set to a high voltage level '1'. N10 is switched "ON" and the drain of N10 is set to a low voltage level '0'.

To set correction term digit 316a to logic level '1', the B_H signal is set to a high voltage level '1' as shown in voltage level transition 702 in FIG. 7. In FIG. 6 this sets the gate of transistor N14 to a high voltage level '1'. N14 is switched on "ON" and provides a low voltage level '0' at the drain of N14 as shown at voltage level transition 706 in FIG. 7. In FIG. 6 the COUT_L signal connected to the drain of N14 is set to a low voltage level '0'.

To complete the Add_Cycle 726 shown in FIG. 7, the A_Z_H signal is set to a low voltage level '0' at voltage transition 712 turning N10 "OFF" in FIG. 6. The B_H signal is set to a low voltage at voltage level transition 714 in FIG. 7 turning N14 "OFF" in FIG. 6. The COUT_L signal is set to a high voltage level '1' at voltage transition level 718 in FIG. 7. It can be seen from the schematic that the Carry_Out bit 402b value is computed within a maximum of two NMOS transistor delays, for example, N14 and N10 in the case described above. It may be also be computed within one transistor delay, for example, N12.

The Correction_plus_PR logic 506 operates in parallel to the Carry_Out logic 504. The Correction_plus_PR logic 506 sets the SINT_Z_L and SINT_M_L signals to a low voltage level '0' or a high voltage level '1' dependent on the voltage levels of the A_P_H, A_Z_H, A_M_H, B_H and B_L signals as shown in Table 4 below.

TABLE 4

| Partial Remainder | | | Correction Term | | Sint | |
|---|---|---|---|---|---|---|
| A_P_H | A_Z_H | A_M_H | B_H | B_L | SINT_Z_L | SINT_M_L |
| 0 | 0 | 1 | 0 | 1 | 1 | 0 |
| 0 | 0 | 1 | 1 | 0 | 0 | 1 |
| 0 | 1 | 0 | 0 | 1 | 0 | 1 |
| 0 | 1 | 0 | 1 | 0 | 1 | 0 |
| 1 | 0 | 0 | 0 | 1 | 1 | 0 |
| 1 | 0 | 0 | 1 | 0 | 0 | 1 |

The operation of the Correction_plus_PR logic 506 is described for the case with current partial remainder digit 314a set to a logic level '0' and correction term digit 316a set to logic level '1' in conjunction with FIG. 6 and FIG. 7. To set current partial remainder digit 314a to a logic level '0', the A_Z_H signal is set to a high voltage level '1' as shown at voltage level transition 700 in FIG. 7. In FIG. 6 the gates of N5 and N6 are set to a high voltage level '1' turning N5 and N6 "ON".

To set correction term digit 316a to a logic level '1', the B_H signal is set to a high voltage level '1' at voltage transition level 702 as shown in FIG. 7. In FIG. 6 the gate of N1 is set to a high voltage level '1' turning N1 "ON". With both N1 and N6 transistors "ON" a low voltage transition level 710 shown in FIG. 7 occurs at the drain of N6. SINT_M_L is connected to the drain of N6 and is set to a low voltage level '0'.

To complete the Add_cycle 726 shown in FIG. 7, the A_Z_H signal is set to a low voltage level '0' at voltage level transition 712 in FIG. 7. The low voltage level '0' turns N5 and N6 "OFF". The B_H signal is set to a low voltage at voltage transition 714 in FIG. 7. In FIG. 6 the low voltage level '0' turns N1 "OFF" and sets the SINT_M_L signal to a high voltage level '1' as shown at voltage level transition 722 in FIG. 7. It can be seen from the schematic in FIG. 6 that the SINT_M_L signal value is always computed within two transistor delays, for example, N1 and N6 in the case described above.

The Add_Carry_In logic 508 operates on the SINT_Z_L and SINT_M_L signals output from the Correction_plus_PR logic 506 and the CINT_L and CINT_H signals from the Carry_Out logic 504 in the previous signed digit adder 404b as shown in FIG. 4. The Add_Carry_In logic 508 includes transistors P5–P12 and N15–N22.

The Add_Carry_In logic 508 sets the SOUT_P_H, SOUT_Z_H and SOUT_M_H signals to a low voltage level '0' or a high voltage level '1' dependent on the voltage levels of the SINT_Z_L, SINT_M_L, CIN_H and CIN_L signals as shown in Table 5 below. In Table 5 the Carry_In bit 402a is set to a logic level '0' or '1'.

TABLE 5

| Carry_In = '0' | | Sint | | Sum | | |
|---|---|---|---|---|---|---|
| CINT_H | CINT_L | SINT_Z_L | SINT_M_L | S_P_H | S_Z_H | S_M_H |
| 0 | 1 | 1 | 0 | 0 | 0 | 1 |
| 0 | 1 | 0 | 1 | 0 | 1 | 0 |
| Carry_In = '1' | | Sint | | Sum | | |
| CINT_H | CINT_L | SINT_Z_L | SINT_M_L | S_P_H | S_Z_H | S_M_H |
| 1 | 0 | 1 | 0 | 0 | 1 | 0 |
| 1 | 0 | 0 | 1 | 1 | 0 | 0 |

The operation of the Add_Carry_In logic 508 is described for the case with the SINT_M_L signal set to a low voltage value and the Carry_In bit 402a set to logic level '0' in conjunction with FIG. 6 and FIG. 7. To set the Carry_In bit 402a to a logic level '0', the CIN_H signal is set to a low voltage level '0' at voltage level transition 704 in FIG. 7. As a result of setting CIN_H signal to a low voltage level '0' the gate of P11 in FIG. 6 is set to a low voltage level '0' turning P11 "ON". The SINT_M_L signal is set to a low level voltage turning P12 and P10 "ON". With both P11 and P12 turned "ON" a high voltage level '1' at transition 708 is provided at the SOUT_M_H signal connected to the drain of P12.

To complete the Add_cycle 726, the SINT_M_L signal is set to a high voltage level '1' at voltage transition 722 in FIG. 7. The high voltage level '1' on SINT_M_L turns P12 and P10 "OFF". The CIN_H signal is set to a high voltage level '1' at voltage transition 716 in FIG. 7 turning P11 "OFF" in FIG. 6. With P11, P10 and P12 turned "OFF", SOUT_M_H is set to a low voltage level '0' at voltage level transition 720 in FIG. 7.

Figure 8:
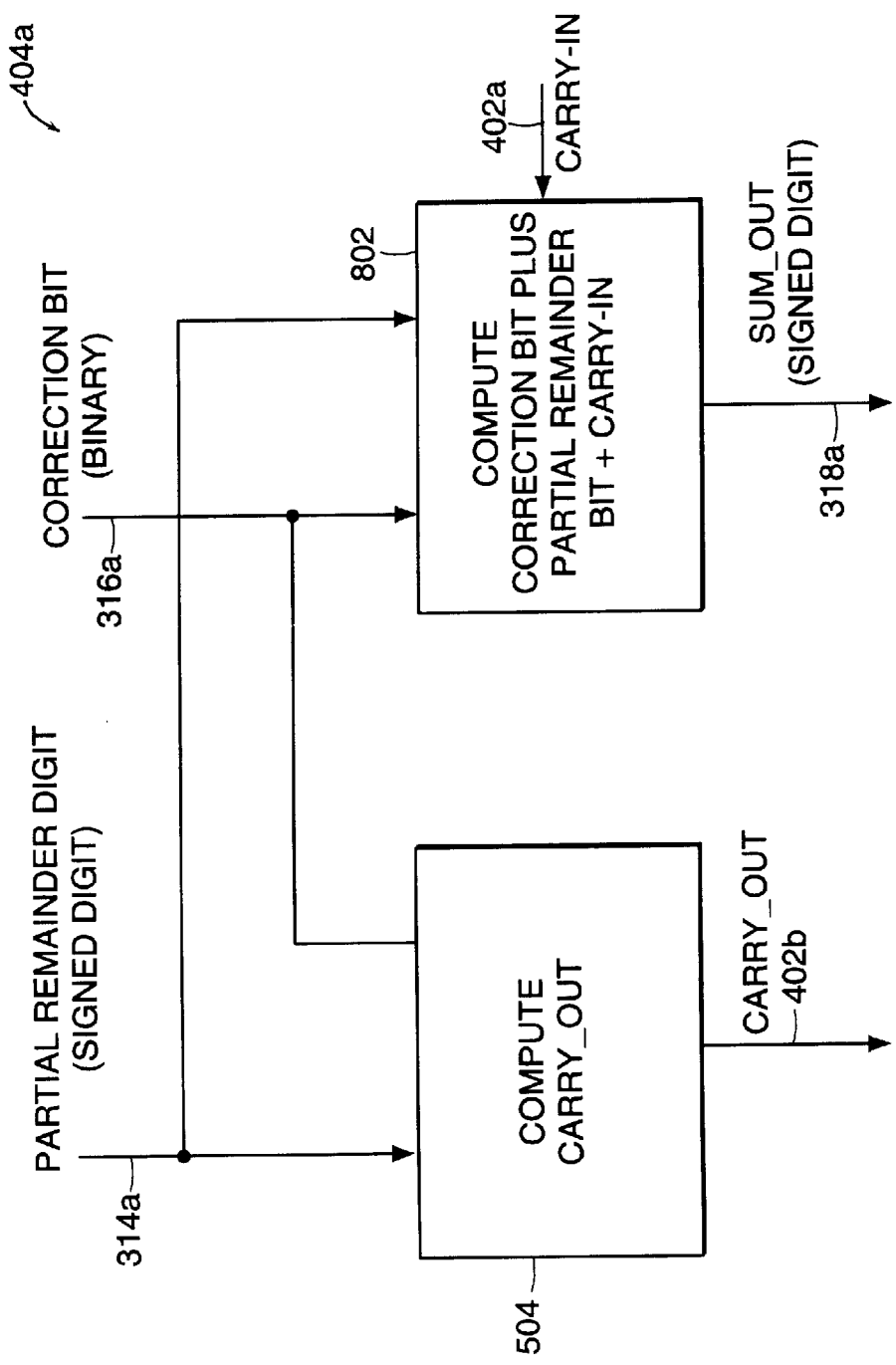
FIG. 8 is a block diagram of another embodiment of any of the signed digit adders shown in FIG. 4.
Figure 9:
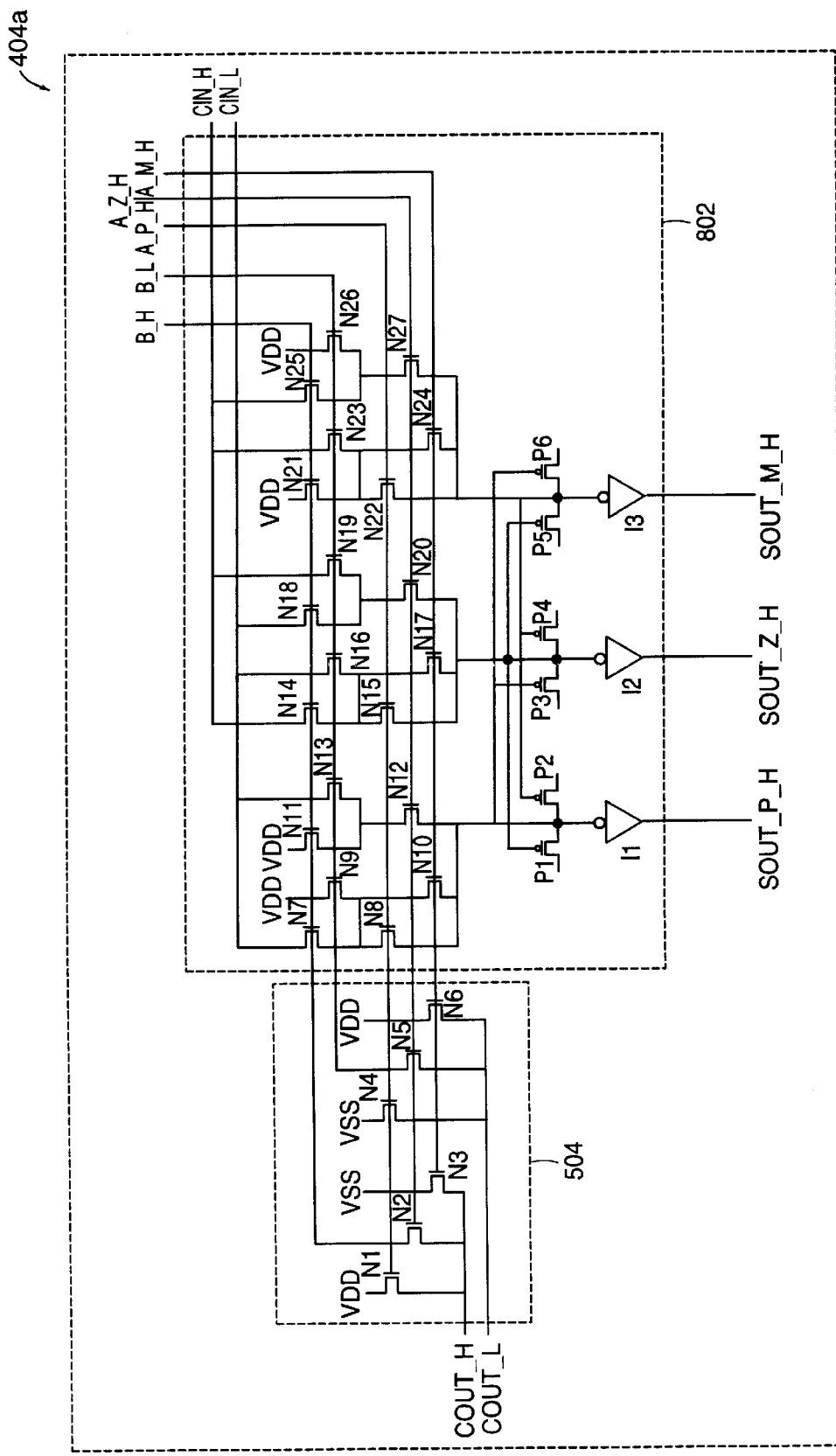
FIG. 9 is a schematic of another embodiment of the present invention employing the adder of FIG. 8.

FIG. 8 and FIG. 9 show an alternate embodiment of the adder 404a of FIG. 4. A block diagram is shown in FIG. 8 and a schematic for an alternative embodiment is shown in FIG. 9. In FIG. 8 the current partial remainder digit 314a is in signed digit format with digit values selected from the radix-2 set {−1, 0, 1} or the radix-4 set {−2, −1, 0, 1, 2}. The signed digit adder 404a adds a current partial remainder digit 314a in signed digit format to a correction term digit 316a in binary format and outputs the Sum_Out digit 318a in signed digit format. The signed digit adder 404a includes a compute carry-out logic 504, and a Correction_PR_CarryIn logic 802.

The Compute_Carry_Out logic 504 computes the value of the Carry_Out bit 402b dependent on the current partial remainder digit 314a and the correction term digit 316a. The Carry_Out bit 402b is computed independent of the Carry_In bit 318a from the previous signed digit adder therefore it differs from a signed digit adder in a CPA, in which the Carry_Out bit 402b is dependent on the Carry_In bit 318a from the previous signed digit adder 404. The Carry_Out bit 402b is computed in parallel with the SumInt 510 and is available as a Carry_In bit 402a to provide the Sum_Out digit 318a. Therefore the adder does not have to wait for a carry to propagate as in the case of a CPA adder. The Carry_In bit 402a is added to the SumInt 510 and the Sum_Out digit 318a is output from the adder. Therefore the Carry_Out bit 402b does not have to be added later, as in the case of a CSA adder The Correction_PR_CarryIn logic 802 computes the sum of the correction term digit 316a, the current partial remainder digit 314a and the Carry_In bit 402a bit and outputs the Sum_Out digit 318a in signed digit format.

The operation of the schematic shown in FIG. 9 is described in conjunction with Table 3 above and Table 6 below.

The schematic includes the blocks, Correction_PR_CarryIn logic 802 and Add_Carry_In logic 508 shown in FIG. 8. The Sum_Out digit 318a, current partial remainder digit 314a, correction term digit 316a, Carry_Out bit 402b and Carry_In bit 402a shown in FIG. 5 are divided into separate signals in FIG. 9 as follows:

The current partial remainder digit 314a in FIG. 8 in signed digit format corresponds to the A_P_H, A_Z_H and A_M_H signals in FIG. 9. The correction term digit 316a shown in FIG. 8 in binary format corresponds to the B_H and the B_L signals in FIG. 9. The Carry_Out bit 402b shown in FIG. 8 in binary format corresponds to the COUT_H and the COUT_L signals in FIG. 9. The Sum_Out digit 318a in FIG. 8 in signed digit format corresponds to the SOUT_P_H, SOUT_Z_H and SOUT_M_H signals in FIG. 9. The Carry_In bit 402a in binary format shown in FIG. 8 corresponds to the CIN_H and the CIN_L signals in FIG. 9.

The Carry_Out logic 504 includes transistors labeled N1–N6. The Carry_Out logic 504 sets the COUT_H and COUT_L signals to a low voltage level '0' or a high voltage level '1' dependent on the voltage levels of the A_P_H, A_Z_H, A_M_H, B_H and B_L signals as shown in Table 3 above.

The operation of the Carry_Out logic 504 is described for the case with current partial remainder digit 314a set to logic level '0' and correction term digit 316a set equal to logic level '1'. To set current partial remainder digit 314a to logic level '0' the A_Z_H signal is set to a high voltage level '1'. The high voltage level '1' on the A_Z_H signal sets the gate of N2 and N5 to a high voltage level '1' turning N2 and N5 "ON".

To set correction term digit 316a to logic level '1', the B_H signal is set to a high voltage level '1'. This sets the source of N2 to a high voltage level '1'. N2 is switched "ON" and provides a high voltage level '1' at the drain of N2. The B_L signal connected to the source of N5 is set to a low voltage level '0'. The COUT_L signal connected to the drain of N5 is set to a low voltage level '0'. It can be seen from the schematic that the Carry_Out bit 402b value is computed within a maximum of one NMOS transistor delay, for example, N5 in the case described above.

The Correction_PR_CarryIn logic 802 operates in parallel with the Carry_Out logic 504. The Correction_plus_PR logic 506 sets the SOUT_P_H, SOUT_Z_H and SOUT_M_H signals to a low voltage level '0' or a high voltage level '1' dependent on the voltage levels of the A_P_H, A_Z_H, A_M_H, B_H, B_L, CIN_L and CIN_H signals as shown in Table 6 below.

Figure 10B:
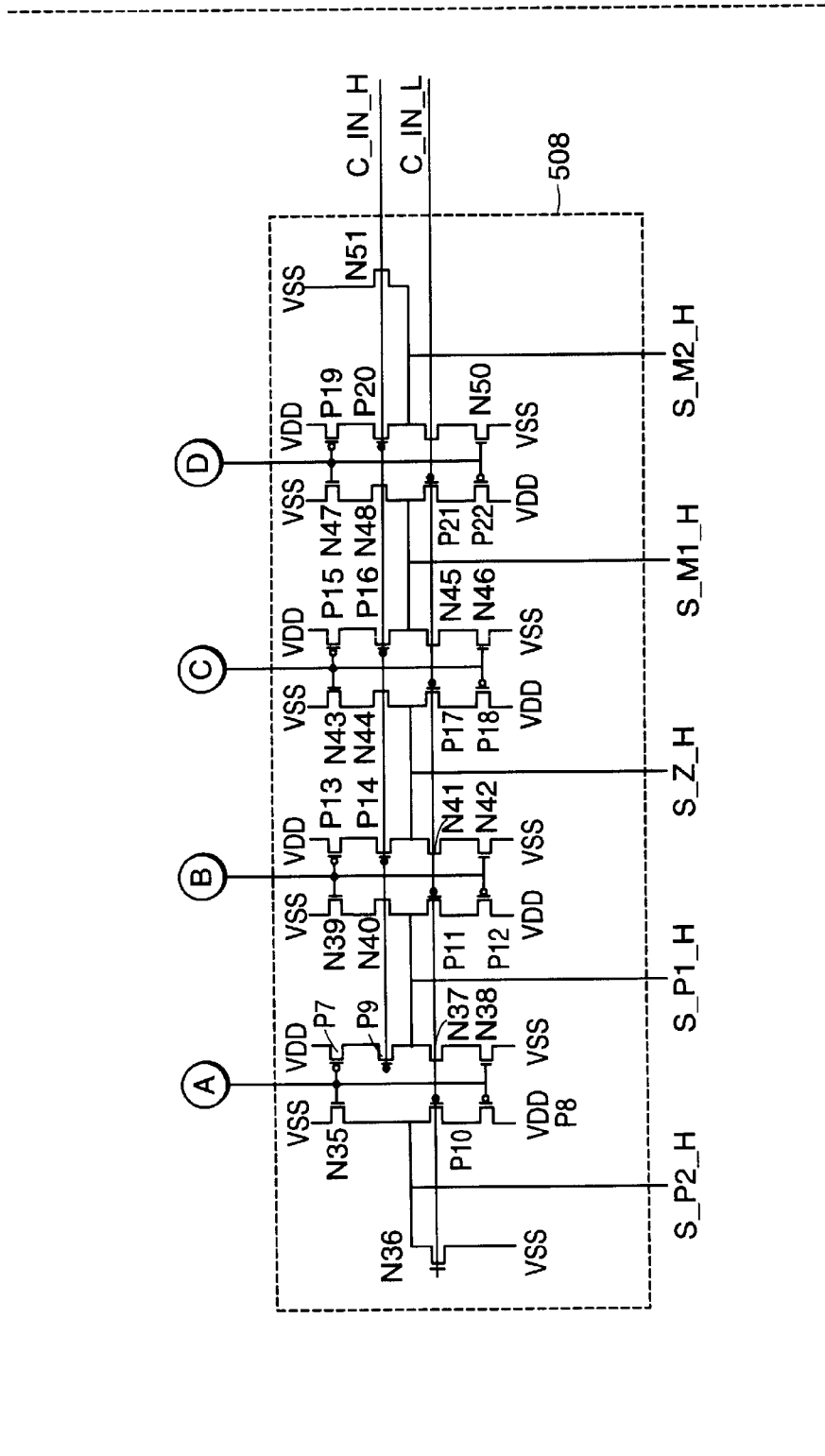
Figure 11:
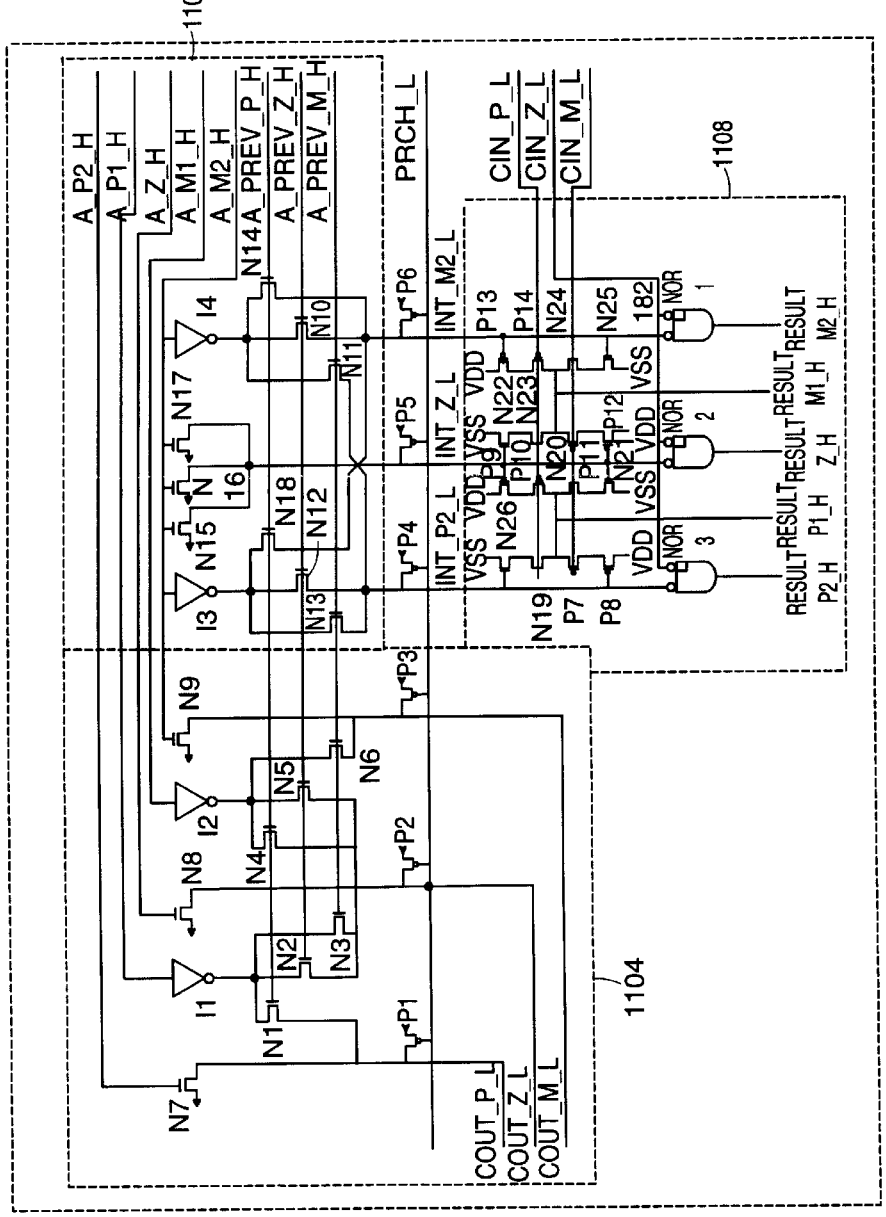
FIG. 11 is a schematic of an embodiment of a scaler shown in FIG. 3 for use with signed digit adders of the type shown in FIGS. 10A–B.

The current partial remainder digit 314a in FIG. 5 in signed digit format corresponds to the AP2_H, A_P1_H, A_Z_H, A_M1_H and A_M2H signals in FIGS. 10A–B. The correction term digit 316a shown in FIG. 5 in binary format corresponds to the B_3_H, B_2_H, B_1_H and B_0_H signals in FIGS. 10A–B. The Carry_Out bit 402b shown in FIG. 5 in binary format corresponds to the COUT_H and the COUT_L signals in FIGS. 10A–B. The Sum_Out digit 318a in FIG. 5 in signed digit format corresponds to the S_P2_H, S_P1_H, S_Z_H S_M1_H and S_M2_H signals in FIGS. 10A–B. The Carry_In bit 402a in binary format corresponds to the CIN_H and the CIN_L signals in FIGS. 10A–B.

TABLE 6

| Partial Remainder | | | Correction Term | | C = 0 | | Sout | | |
|---|---|---|---|---|---|---|---|---|---|
| A_P_H | A_Z_H | A_M_H | B_H | B_L | CIN_L | CIN_H | S_P_H | S_Z_H | S_M_H |
| 0 | 0 | 1 | 0 | 1 | 1 | 0 | 0 | 0 | 1 |
| 0 | 0 | 1 | 1 | 0 | 1 | 0 | 0 | 1 | 0 |
| 0 | 1 | 0 | 0 | 1 | 1 | 0 | 0 | 1 | 0 |
| 0 | 1 | 0 | 1 | 0 | 1 | 0 | 0 | 0 | 1 |
| 1 | 0 | 0 | 0 | 1 | 1 | 0 | 0 | 0 | 1 |
| 1 | 0 | 0 | 1 | 0 | 1 | 0 | 0 | 1 | 0 |

| Partial Remainder | | | Correction Term | | C = 1 | | Sout | | |
|---|---|---|---|---|---|---|---|---|---|
| A_P_H | A_Z_H | A_M_H | B_H | B_L | CIN_L | CIN_H | S_P_H | S_Z_H | S_M_H |
| 0 | 0 | 1 | 0 | 1 | 0 | 1 | 0 | 1 | 0 |
| 0 | 0 | 1 | 1 | 0 | 0 | 1 | 1 | 0 | 0 |
| 0 | 1 | 0 | 0 | 1 | 0 | 1 | 1 | 0 | 0 |
| 0 | 1 | 0 | 1 | 0 | 0 | 1 | 0 | 1 | 0 |
| 1 | 0 | 0 | 0 | 1 | 0 | 1 | 0 | 1 | 0 |
| 1 | 0 | 0 | 1 | 0 | 0 | 1 | 1 | 0 | 0 |

The operation of the Correction_PR_CarryIn logic 802 is described for the case with current partial remainder digit 314a set to a logic level '0', Correction term digit 316a set to logic level '1' and Carry_In bit set to a logic '0'. To set current partial remainder digit 314a to a logic level '0', the A_Z_H signal is set to a high voltage level '1'. The gates of N27, N20 and N12 are set to a high voltage level '1' turning N27, N20 and N12 "ON".

To set correction term digit 316a to a logic level '1', the B_H signal is set to a high voltage level '1'. The gates of N7, N11, N14, N18, N21 and N25 are set to a high voltage level '1' turning N7, N11, N14, N18, N21 and N25 "ON". With N25 and N27 turned 'ON' the CIN_H set to a low voltage level '0' provides a low voltage level '0' at the source of N27. The low voltage level '0' at the input of inverter I3 sets the SOUT_M signal to a high voltage level '1'.

FIGS. 10A–B show a schematic of another embodiment of the signed digit adder 404a shown in FIG. 4. The schematic includes the blocks, Correction_plus_PR logic 506, Add_Carry_In logic 508 and Compute_Carry_Out logic 504 shown in FIG. 5. The SumInt 510, Sum_Out digit 318a, current partial remainder digit 314a, correction term digit 316a, Carry_Out bit 402b and Carry_In bit 402a shown in FIG. 5 are divided into separate signals in FIGS. 10A–B as follows:

The COUT_H, COUT_L, S_P2_H, S_P1_H, S_Z_H, S_M1_H and S_M2_H signals are set to pre-defined voltage levels. The PRCH_L signal sets the voltage levels through PMOS transistors P1–P6. Output signals COUT_H and COUT_L are precharged to a high voltage level '1'. Output signals S_P2_H, S_P1_H, S_Z_H, S_M1_H and S_M2_H are precharged to a low voltage level '0'.

The operation of the precharge cycle 724 in FIG. 7 is described for the COUT_L signal in the schematic in FIGS. 10A–B. In FIGS. 10A–B the PRCH_L signal is initially set to a low voltage level '0'. The PRCH_L signal is connected to the gate of P1. P1 is turned "ON" when a low voltage level '0' is applied to the gate. The source 1002 of P1 is connected to a high voltage level '1' and the high voltage level '1' is applied to the COUT_L signal which is connected to P1's drain precharging COUT_L to a high voltage level '1'.

The Carry_Out logic 504 includes transistors N1–N14 and invertors labeled I1–I4. The Carry_Out logic 504 conditionally sets the COUT_H and COUT_L signals to a low voltage level '0' dependent on the voltage levels of the A_P2_H, A_P1_H, A_Z_H, A_M1_H, A_M2_H, B_3_H, B_2_H, B_1_H and B_0_H signals as shown in Table 7 below.

TABLE 7

| Partial Remainder | | | | | Correction Term | | | | Carry_Out | |
|---|---|---|---|---|---|---|---|---|---|---|
| A_P2_H | A_P1_H | A_Z_H | A_M1_H | A_M2_H | B_3_H | B_2_H | B_1_H | B_0_H | COUT_H | COUT_L |
| 0 | 0 | 0 | 0 | 1 | 0 | 0 | 0 | 1 | 0 | 1 |
| 0 | 0 | 0 | 0 | 1 | 0 | 0 | 1 | 0 | 0 | 1 |
| 0 | 0 | 0 | 0 | 1 | 0 | 1 | 0 | 0 | 0 | 1 |
| 0 | 0 | 0 | 0 | 1 | 1 | 0 | 0 | 0 | 0 | 1 |
| 0 | 0 | 0 | 1 | 0 | 0 | 0 | 0 | 1 | 0 | 1 |
| 0 | 0 | 0 | 1 | 0 | 0 | 0 | 1 | 0 | 0 | 1 |
| 0 | 0 | 0 | 1 | 0 | 0 | 1 | 0 | 0 | 0 | 1 |
| 0 | 0 | 0 | 1 | 0 | 1 | 0 | 0 | 0 | 1 | 0 |
| 0 | 0 | 1 | 0 | 0 | 0 | 0 | 0 | 1 | 0 | 1 |
| 0 | 0 | 1 | 0 | 0 | 0 | 0 | 1 | 0 | 0 | 1 |
| 0 | 0 | 1 | 0 | 0 | 0 | 1 | 0 | 0 | 1 | 0 |
| 0 | 0 | 1 | 0 | 0 | 1 | 0 | 0 | 0 | 1 | 0 |
| 0 | 1 | 0 | 0 | 0 | 0 | 0 | 0 | 1 | 0 | 1 |
| 0 | 1 | 0 | 0 | 0 | 0 | 0 | 1 | 0 | 1 | 0 |
| 0 | 1 | 0 | 0 | 0 | 0 | 1 | 0 | 0 | 1 | 0 |
| 0 | 1 | 0 | 0 | 0 | 1 | 0 | 0 | 0 | 1 | 0 |
| 1 | 0 | 0 | 0 | 0 | 0 | 0 | 0 | 1 | 1 | 0 |
| 1 | 0 | 0 | 0 | 0 | 0 | 0 | 1 | 0 | 1 | 0 |
| 1 | 0 | 0 | 0 | 0 | 0 | 1 | 0 | 0 | 1 | 0 |
| 1 | 0 | 0 | 0 | 0 | 1 | 0 | 0 | 0 | 1 | 0 |

The operation of the Carry_Out logic 504 is described for the case with current partial remainder digit 314a set to logic level '0' and Correction term digit 316a set to logic level '1' in conjunction with FIGS. 10A–B. To set current partial remainder digit 314a to logic level '0', the A_Z_H signal is set to a high voltage level '1'. This sets the gates of N10, N12, N5 and N3 to a high voltage level '1', turning N10, N12, N5 and N3 "ON".

To set correction term digit 316a to a logic level '1', the B_1_H signal is set to a high voltage level '1'. This sets the output of inverter I3 to a low voltage level '0' and sets the drain of transistor N10 to a low voltage level '0'. This sets the source of transistor N10 to a low voltage level '0' because transistor N10 is "ON" and provides a low voltage level '0' at COUT_H signal setting Carry_Out bit 402a to logic level '0'.

It can be seen from the schematic that the value of the Carry_Out bit 402b is computed within a maximum of one inverter and one transistor delay, for example, through I3 and N10 in the case described above.

The Correction_plus_PR logic 506 operates in parallel with the Carry_Out logic 504. The Correction_plus_PR logic 506 includes transistors N15–N34. The Correction_plus_PR logic 506 conditionally sets the U_P1_L, U_Z_L, U_M1_L and U_M2_L signals to a low voltage level '0' dependent on the voltage levels of the A_P2_H, A_P1_H, A_Z_H, A_M1_H, A_M2_H, B_3_H, B_2_H, B_1_H, and B_0_H signals as shown in Table 8 below.

TABLE 8

| Partial Remainder | | | | | Correction Term | | | | Intermediate Sum | | | |
|---|---|---|---|---|---|---|---|---|---|---|---|---|
| A_P2 | A_P1 | A_Z | A_M1 | A_M2 | B_3 | B_2 | B_1 | B_0 | U_P1 | U_Z | U_M1 | U_M2 |
| 0 | 0 | 0 | 0 | 1 | 0 | 0 | 0 | 1 | 1 | 1 | 1 | 0 |
| 0 | 0 | 0 | 0 | 1 | 0 | 0 | 1 | 0 | 1 | 1 | 0 | 1 |
| 0 | 0 | 0 | 0 | 1 | 0 | 1 | 0 | 0 | 1 | 0 | 1 | 1 |
| 0 | 0 | 0 | 0 | 1 | 1 | 0 | 0 | 0 | 0 | 1 | 1 | 1 |
| 0 | 0 | 0 | 1 | 0 | 0 | 0 | 0 | 1 | 1 | 1 | 0 | 1 |
| 0 | 0 | 0 | 1 | 0 | 0 | 0 | 1 | 0 | 1 | 0 | 1 | 1 |
| 0 | 0 | 0 | 1 | 0 | 0 | 1 | 0 | 0 | 0 | 1 | 1 | 1 |
| 0 | 0 | 0 | 1 | 0 | 1 | 0 | 0 | 0 | 1 | 1 | 1 | 0 |
| 0 | 0 | 1 | 0 | 0 | 0 | 0 | 0 | 1 | 1 | 0 | 1 | 1 |
| 0 | 0 | 1 | 0 | 0 | 0 | 0 | 1 | 0 | 0 | 1 | 1 | 1 |
| 0 | 0 | 1 | 0 | 0 | 0 | 1 | 0 | 0 | 1 | 1 | 1 | 0 |
| 0 | 0 | 1 | 0 | 0 | 1 | 0 | 0 | 0 | 1 | 1 | 0 | 1 |
| 0 | 1 | 0 | 0 | 0 | 0 | 0 | 0 | 1 | 0 | 1 | 1 | 1 |
| 0 | 1 | 0 | 0 | 0 | 0 | 0 | 1 | 0 | 1 | 1 | 1 | 0 |
| 0 | 1 | 0 | 0 | 0 | 0 | 1 | 0 | 0 | 1 | 1 | 0 | 1 |
| 0 | 1 | 0 | 0 | 0 | 1 | 0 | 0 | 0 | 1 | 0 | 1 | 1 |
| 1 | 0 | 0 | 0 | 0 | 0 | 0 | 0 | 1 | 1 | 1 | 1 | 0 |
| 1 | 0 | 0 | 0 | 0 | 0 | 0 | 1 | 0 | 1 | 1 | 0 | 1 |
| 1 | 0 | 0 | 0 | 0 | 0 | 1 | 0 | 0 | 1 | 0 | 1 | 1 |
| 1 | 0 | 0 | 0 | 0 | 1 | 0 | 0 | 0 | 0 | 1 | 1 | 1 |

The operation of the Correction_plus_PR logic 506 is described for the case with current partial remainder digit 314a set to logic level '0' and correction term digit 316a set to logic level '1' in conjunction with FIGS. 10A–B. To set current partial remainder digit 314*a* to logic level '0' the A_Z_H signal is set to a high voltage level '1'. FIGS. 10A–B the gates of transistors N18, N23, N28 and N33 in turn are set to a high voltage level '1' turning transistors N18, N23, N28 and N33 "ON". To set correction term digit 316*a* to logic level '1' the signal B_1_H is set to a high voltage level '1'. A high voltage level '1' on B_1_H through invertor 17 provides a low voltage level '0' at the source of transistors N18, N22 and N26. This provides a low voltage level '0' on the U_P1_L signal connected to the drain of transistor N18. It can be seen from the schematic that the values of the SumInt 510 signals U_Z, U_P, U_M2 and U_M1 are always computed within one invertor and one transistor delay, for example, 17 and N23 in the case described above.

The U_Z_L, U_P1_L, U_M2_L and U_M1_L signals from the Correction_plus_PR logic 506 and the CIN_H and CIN_L signals from the Carry_Out logic 504 in the previous signed digit adder 404 are input to the Add_Carry_In logic 508. The Add_Carry_In logic 508 includes transistors P8–P20 and N35–N50.

The Add_Carry_In logic 508 sets the S_P2_H, S_P1_H, S_Z_H, S_M1_H and S_M2_H signals to a low voltage level '0' or a high voltage level '1' dependent on the voltage levels of the U_P1_L, U_Z_L, U_M1_L, U_M2_L, CIN_H and CIN_L signals as shown in Table 9 below.

P14 and P13 transistors "ON" a high voltage level '1' is provided at S_Z_H at the drain of P14.

To scale the result of the {−2, −1, 0, 1, 2} adder the Sum_Out 318 is multiplied by two in the scaler 310(FIG. 3). The scaler 310 in the embodiment shown in FIG. 11 includes a Scaler_Carry_Out logic 1104, a Scaler_Intermediate_Result logic 1102 and a Scaler_Result logic 1108. The input signals to the {−2, −1, 0, 1, 2} scaler shown in FIG. 11 correspond to signals in FIG. 10 as follows: A_P2_H, A_P1_H A_Z_H, A_M1_H and A_M2_H are the Sum_Out digit 318*a* from the signed digit adder 404*a*. A_PREV_P_H, A_PREV_Z_H and A_PREV_M_H are derived from the signed digit inputs to the previous, lower order, signed digit adder 404.

The Scaler_Carry_Out logic 1104 generates a signed digit Scaler_Carry bit for the current bit of the scaler; this is propagated to the next most significant digit of the scaler 310. The Scaler_Carry_Out logic 1104 includes transistors N1–N9 and P1–P3, and invertors I1 and I2. Transistors P1–P3 set the CIN_P_L, CIN_Z_L and CIN_M_L signals to a high voltage level '1' if the PRCH_L signal is at a low voltage level '0' at the gates of transistors P1, P2 and P3 turning transistors P1, P2 and P3 "ON".

The Scaler_Carry_Out logic 1104 generates a low voltage level '0' on the CIN_P_L, CIN_Z_L and CIN_M_L signals dependent on the voltage levels on the A_P2_H, A_P1_H, A_Z_H, A_M1_H, A_M2_H, A_PREV_

TABLE 9

| Intermediate Sum | | | | Carry In = '1' | | Sum_Out | | | | |
|---|---|---|---|---|---|---|---|---|---|---|
| U_P1 | U_Z | U_M1 | U_M2 | CIN_H | CIN_L | S_P2 | S_P1 | S_Z | S_M1 | S_M2 |
| 1 | 1 | 1 | 0 | 1 | 0 | 0 | 0 | 0 | 1 | 0 |
| 1 | 1 | 0 | 1 | 1 | 0 | 0 | 0 | 1 | 0 | 0 |
| 1 | 0 | 1 | 1 | 1 | 0 | 0 | 1 | 0 | 0 | 0 |
| 0 | 1 | 1 | 1 | 1 | 0 | 1 | 0 | 0 | 0 | 0 |

| Intermediate Sum | | | | Carry In = '0' | | Sum_Out | | | | |
|---|---|---|---|---|---|---|---|---|---|---|
| U_P1 | U_Z | U_M1 | U_M2 | CIN_H | CIN_L | S_P2 | S_P1 | S_Z | S_M1 | S_M2 |
| 1 | 1 | 1 | 0 | 0 | 1 | 0 | 0 | 0 | 0 | 1 |
| 1 | 1 | 0 | 1 | 0 | 1 | 0 | 0 | 0 | 1 | 0 |
| 1 | 0 | 1 | 1 | 0 | 1 | 0 | 0 | 1 | 0 | 0 |
| 0 | 1 | 1 | 1 | 0 | 1 | 0 | 1 | 0 | 0 | 0 |

The operation of the Add_Carry_In logic 508 is described for the case with U_Z_L set to a low voltage value and Carry_In bit 402*a* set to a logic level '0' in conjunction with FIGS. 10A–B. To set Carry_In bit 402*a* to a logic level '0', the CIN_H signal is set to a low voltage level '0'. As a result of setting the CIN_H signal to a low voltage level '0' the gates of P20, P16, P14 and P9 are set to a low voltage level '0' turning transistors P20, P16, P14 and P9 "ON". U_Z_L is set to a low level voltage at the gates of P13 and P12, turning P13 and P12 "ON". With both P_H, A_PREV_Z_H and A_PREV_M_H signals according to Table 10 below. The operation of the Scaler_Carry_Out logic 1104 is described by discussing the case with input signal A_P2_H set to a high voltage level '1' and input signal A_PREV_Z_H set to a high voltage level '1'. The A_P2_H signal set to a high voltage level '1' at the gates of N7 and N15 turns N7 and N15 "ON" and provides a low voltage level '0' on the C_P_H output signal.

TABLE 10

| Adder Sum Output | | | | | Adder Sum Output, Previous (Lower Order) Digit | | | Scaler Carry | | |
|---|---|---|---|---|---|---|---|---|---|---|
| A_P2 | A_P1 | A_Z | A_M2 | A_M1 | A_PREV_P | A_PREV_Z | A_PREV_M | C_P | C_Z | C_M |
| 1 | 0 | 0 | 0 | 0 | 1 | 0 | 0 | 0 | 1 | 1 |
| 1 | 0 | 0 | 0 | 0 | 0 | 1 | 0 | 0 | 1 | 1 |
| 1 | 0 | 0 | 0 | 0 | 0 | 0 | 1 | 0 | 1 | 1 |
| 0 | 1 | 0 | 0 | 0 | 1 | 0 | 0 | 0 | 1 | 1 |

TABLE 10-continued

| | | | | | | | | | | |
|---|---|---|---|---|---|---|---|---|---|---|
| 0 | 1 | 0 | 0 | 0 | 0 | 1 | 0 | 1 | 0 | 1 |
| 0 | 1 | 0 | 0 | 0 | 0 | 0 | 1 | 1 | 0 | 1 |
| 0 | 0 | 1 | 0 | 0 | 1 | 0 | 0 | 1 | 0 | 1 |
| 0 | 0 | 1 | 0 | 0 | 0 | 1 | 0 | 1 | 0 | 1 |
| 0 | 0 | 1 | 0 | 0 | 0 | 0 | 1 | 1 | 0 | 1 |
| 0 | 0 | 0 | 1 | 0 | 1 | 0 | 0 | 1 | 0 | 1 |
| 0 | 0 | 0 | 1 | 0 | 0 | 1 | 0 | 1 | 0 | 1 |
| 0 | 0 | 0 | 1 | 0 | 0 | 0 | 1 | 1 | 1 | 0 |
| 0 | 0 | 0 | 0 | 1 | 1 | 0 | 0 | 1 | 1 | 0 |
| 0 | 0 | 0 | 0 | 1 | 0 | 1 | 0 | 1 | 1 | 0 |
| 0 | 0 | 0 | 0 | 1 | 0 | 0 | 1 | 1 | 1 | 0 |

The Scaler_Intermediate_Result logic 1102 includes transistors labeled N10–N18 and invertors labeled I3–I4. The Scaler_Intermediate_Result logic 1102 provides voltage levels on output signals INT_P2_L, INT_Z_L, INT_M2_L dependent on the voltage levels on input signals A_P2_H, A_P1_H, A_Z_H, A_M2, A_M1, A_PREV_P_H, A_PREV_Z_H and A_PREV_M_H according to Table 11 below. The operation of the Scaler_Carry_Out logic 1104 is described by describing the case with input signal A_P2_H set to a high voltage level '1' and A_PREV_P2_H set to a high voltage level '1'. A high voltage level '1' on A_PREV_P2_H provides a high voltage level '1' at the gate of transistor N14, turning transistor N14 "ON". This provides a high voltage level '1' on signal INT_M2_L. With A_P2_H set to a high voltage level '1', a high voltage level '1'. is provided at the gates of transistors N15 and N7. The high voltage level '1' turns transistors N7 and N15 "ON". Transistor N15 "ON" provides a low voltage level '0' on output signal INT_Z_L.

Scaler_Carry_In signal includes signals CIN_P_L, CIN_Z_L and CIN_M_L. The signed digit intermediate result includes signals INT_P2_L, INT_Z_L and INT_M2_L. The Scaler_Result logic 1108 provides voltage levels on the output signals RESULT_P2_H, RESULT_P1_H, RESULT_Z_H, RESULT_M1_H and RESULT_M2_H signals dependent on the voltage levels on the CIN_P_L, CIN_Z_L, CIN_M_L, INT_P2_L, INT_Z_L and INT_M2_L input signals corresponding to the voltage levels in Table 12.

The operation of the Scaler_Result logic 1108 is described by discussing the case with the CIN_P_L signal set to a low voltage level '0' and the INT_M2_L signal set to a low voltage level '0'. With the INT_M2_L signal set to a low voltage level '0', the gate of transistor P13 is at a low voltage level '0' and transistor P14 is turned "ON". With the CIN_P_L signal set to a low voltage level '0' the gate of transistor P13 is at a low voltage level '0' and transistor

TABLE 11

| Adder Sum Output | | | | | Adder Sum Output, Previous (Lower Order) Digit | | | Scaler Intermediate | | |
|---|---|---|---|---|---|---|---|---|---|---|
| A_P2 | A_P1 | A_Z | A_M2 | A_M1 | A_PREV_P | A_PREV_Z | A_PREV_M | INT_P2 | INT_Z | INT_M2 |
| 1 | 0 | 0 | 0 | 0 | 1 | 0 | 0 | 1 | 0 | 1 |
| 1 | 0 | 0 | 0 | 0 | 0 | 1 | 0 | 1 | 0 | 1 |
| 1 | 0 | 0 | 0 | 0 | 0 | 0 | 1 | 1 | 0 | 1 |
| 0 | 1 | 0 | 0 | 0 | 1 | 0 | 0 | 1 | 1 | 0 |
| 0 | 1 | 0 | 0 | 0 | 0 | 1 | 0 | 1 | 1 | 0 |
| 0 | 1 | 0 | 0 | 0 | 0 | 0 | 1 | 0 | 1 | 1 |
| 0 | 0 | 1 | 0 | 0 | 1 | 0 | 0 | 1 | 0 | 1 |
| 0 | 0 | 1 | 0 | 0 | 0 | 1 | 0 | 1 | 0 | 1 |
| 0 | 0 | 1 | 0 | 0 | 0 | 0 | 1 | 1 | 0 | 1 |
| 0 | 0 | 0 | 1 | 0 | 1 | 0 | 0 | 1 | 1 | 0 |
| 0 | 0 | 0 | 1 | 0 | 0 | 1 | 0 | 1 | 1 | 0 |
| 0 | 0 | 0 | 1 | 0 | 0 | 0 | 1 | 0 | 1 | 1 |
| 0 | 0 | 0 | 0 | 1 | 1 | 0 | 0 | 1 | 0 | 1 |
| 0 | 0 | 0 | 0 | 1 | 0 | 1 | 0 | 1 | 0 | 1 |
| 0 | 0 | 0 | 0 | 1 | 0 | 0 | 1 | 1 | 0 | 1 |

The Scaler_Result logic 1108 provides signed digit output signals dependent on a signed digit Scaler_Carrying_ signal and a signed digit intermediate result. The signed digit P13 is turned "ON". Transistors P13 and P14 "ON" provides a high voltage level '1' on the output signal RESULT_M1_H.

TABLE 12

| Intermediate Result | | | Scaler Carry In (CIN_) | | | Result (RESULT_) | | | | |
|---|---|---|---|---|---|---|---|---|---|---|
| P2_L | Z_L | M2_L | P_L | Z_L | M_L | P2_H | P1_H | Z_H | M1_H | M2_H |
| 1 | 1 | 0 | 1 | 1 | 0 | 0 | 0 | 0 | 0 | 0 |

TABLE 12-continued

| Intermediate Result | | | Scaler Carry In (CIN_) | | | Result (RESULT_) | | | | |
|---|---|---|---|---|---|---|---|---|---|---|
| P2_L | Z_L | M2_L | P_L | Z_L | M_L | P2_H | P1_H | Z_H | M1_H | M2_H |
| 1 | 1 | 0 | 1 | 0 | 1 | 0 | 0 | 0 | 0 | 1 |
| 1 | 1 | 0 | 0 | 1 | 1 | 0 | 0 | 0 | 1 | 0 |
| 1 | 0 | 1 | 1 | 1 | 0 | 0 | 0 | 0 | 1 | 0 |
| 1 | 0 | 1 | 1 | 0 | 1 | 0 | 0 | 1 | 0 | 0 |
| 1 | 0 | 1 | 0 | 1 | 1 | 0 | 1 | 0 | 0 | 0 |
| 0 | 1 | 1 | 1 | 1 | 0 | 0 | 1 | 0 | 0 | 0 |
| 0 | 1 | 1 | 1 | 0 | 1 | 1 | 0 | 0 | 0 | 0 |
| 0 | 1 | 1 | 0 | 1 | 1 | 0 | 0 | 0 | 0 | 0 |

While this invention has been particularly shown and described with references preferred embodiments thereof, it will be understood by those skilled in the art that various changes in form and details may be made therein without departing from the spirit and scope of the invention as defined by the appended claims.

What is claimed is:

1. In a computer system, apparatus for performing a square root operation on a radicand, producing a root digit, the apparatus comprising:
    a digit generator, the digit generator computing the root digit dependent on a number of digits of a current signed digit partial remainder;
    an adder which receives a binary correction term and the current signed digit remainder and generates a signed digit result by subtracting the binary correction term from the current signed digit partial remainder; and
    a scaler coupled to the adder, the scaler computing the next signed digit partial remainder dependent on the signed digit result.

2. The apparatus as claimed in claim 1 wherein the digits of the signed digit partial remainder are selected from the set of minus one, zero and one.

3. The apparatus as claimed in claim 2 wherein the adder computes a carry out independent of a carry in.

4. The apparatus as claimed in claim 3 wherein the number of digits of the current signed digit partial remainder is equal to four.

5. The apparatus as claimed in claim 4 wherein output signals in the adder are initialized to predetermined voltage levels.

6. The apparatus as claimed in claim 5 wherein the adder further comprises:
    a compute carry out logic accepting as input a digit of the current signed digit partial remainder and a digit of the binary correction term and producing a carry out digit;
    a correction plus PR logic accepting as input a digit of the current signed digit partial remainder and a digit of the binary correction term and producing an intermediate sum; and
    an add carry logic accepting as input the intermediate sum digit and a carry in digit from a previous signed digit adder and producing a next partial remainder signed digit.

7. The apparatus as claimed in claim 6 wherein
    the digit of the current signed digit partial remainder comprises three separate signals and one of the signals is asserted to indicate the state of the current signed digit partial remainder;
    the digit of the binary correction term comprises two separate signals and the signals are appropriately asserted to indicate the state of the binary correction term digit;
    the digit of the carry out comprises two separate signals and the signals are appropriately asserted to indicate the state of the carry out digit;
    the intermediate sum comprises a minus signal and a zero signal;
    the digit of the carry in comprises two separate signals and the signals are appropriately asserted to indicate the state of the carry in digit; and
    the digit output from the add carry logic comprises three separate signals, a sum zero signal, a sum minus signal and a sum plus signal, and one of the signals is asserted to indicate the state of the add carry logic output digit.

8. The apparatus as claimed in claim 7 wherein the compute carry out logic
    sets the state of the carry out digit to zero if the state of the current partial remainder digit is minus one or the state of the current partial remainder digit is set to zero and the state of the binary correction term digit is set to zero; and
    sets the state of the carry out digit to one if the state of the current partial remainder digit is one or the state of the current partial remainder digit is set to zero and the state of the binary correction term digit is set to one.

9. The apparatus as claimed in claim 8 wherein the correction plus PR logic
    asserts the zero signal if both the binary correction term digit and the current partial remainder digit are set to zero or if neither of the binary correction term digit and the current partial remainder digit is set to zero; and
    asserts the minus signal if only one of either the binary correction term digit or the current partial remainder digit is set to a zero.

10. The apparatus as claimed in claim 9 wherein the add carry logic
    asserts the sum minus signal if the minus signal is asserted and the carry in is set to zero;
    asserts the sum zero signal if the carry in is set to a zero and the zero signal is asserted or if the carry in is set to a one and the minus signal is asserted; and
    asserts the sum plus signal if the zero signal is asserted and the carry in is asserted.

11. The apparatus as claimed in claim 1 wherein the scaler computes the next signed digit partial remainder by scaling the current signed digit partial remainder upward.

12. The apparatus as claimed in claim 1 wherein the digits of the current signed digit partial remainder are selected from the set of minus two, minus one, zero, plus one and plus two.

13. The apparatus as claimed in claim 12 wherein the number of digits of the current signed digit partial remainder is equal to two.

14. The apparatus as claimed in claim 13 wherein the adder computes a carry out independent of a carry in.

15. The apparatus as claimed in claim 14 wherein output signals in the adder are initialized to predetermined voltage levels.

16. The apparatus as claimed in claim 1 wherein, the digits of the signed digit partial remainder are selected from a set comprising more than two digit values.

17. An apparatus as claimed in claim 16 wherein the adder further comprises:
   a compute carry out logic accepting as input a digit of the current signed digit partial remainder and a digit of the binary correction term and producing a carry out digit;
   a correction plus PR logic accepting as input a digit of the current signed digit partial remainder and a digit of the binary correction term and producing an intermediate sum; and
   an add carry logic accepting as input the intermediate sum digit and a carry in digit from a previous signed digit adder and producing a next partial remainder signed digit.

18. The apparatus as claimed in claim 17 wherein
   the digit of the current signed digit partial remainder comprises five separate signals and one of the signals is asserted to indicate the state of the digit of the current signed digit partial reminder;
   the digit of the binary correction term comprises a three signal, a two signal, a one signal and a zero signal and one of the signals is asserted to indicate the state of the binary correction term digit;
   the digit of the carry out comprises two separate signals and the signals are appropriately asserted to indicate the state of the carry out digit;
   the intermediate sum comprises a minus one signal, a minus two signal, an intermediate zero signal and a plus one signal;
   the digit of the carry in comprises two separate signals and the signals are appropriately asserted to indicate the state of the carry in digit; and
   the digit output from the add carry logic comprises five separate signals, a sum zero signal, a sum minus one signal, a sum minus two signal, a sum plus one signal, a sum plus two signal and one of the signals is asserted to indicate the state of the digit output from the add carry logic.

19. The apparatus as claimed in claim 18 wherein the compute carry out logic
   sets the state of the carry out digit to one if the state of the current signed partial remainder digit is plus two or if the state of the current signed partial remainder digit is plus one and the zero signal of the binary correction term is not asserted or if the state of the current signed partial remainder digit is zero and neither the two signal or the three signal is asserted.

20. The apparatus as claimed in claim 19 wherein the correction plus PRB logic asserts the minus one signal if the current signed partial remainder digit is set to minus two and the binary correction term's one signal is asserted or if the current signed partial remainder digit is set to minus one and the binary correction term's zero signal is asserted or if the current signed partial remainder digit is set to zero and the three signal is asserted or if the current signed partial remainder digit is set to plus one and the binary correction term's two signal is asserted or if the current signed partial remainder digit is set to plus two and the binary correction term's plus one signal is asserted.

21. The apparatus as claimed in claim 19 wherein the correction plus PRB logic the apparatus as claimed in claim 19 wherein the correction plus PRB logic asserts the intermediate zero signal if the current signed partial remainder digit is set to minus two and the binary correction term's two signal is asserted or if the current signed partial remainder digit is set to minus one and the binary correction term's one signal is asserted or if the current signed partial remainder digit is set to zero and the binary correction term's zero signal is asserted or if the current signed partial remainder digit is set to plus one and the binary correction term's three signal is asserted or if the current signed partial remainder digit is set to plus two and the binary correction term's two signal is asserted.

22. The apparatus as claimed in claim 19 wherein the correction plus PRB logic
   asserts the plus one signal if the current signed partial remainder digit is set to minus two and the binary correction term's three signal is asserted or if the current signed partial remainder digit is set to minus one and the binary correction term's two signal is asserted or if the current signed partial remainder digit is set to zero and the binary correction term's one signal is asserted or if the current signed partial remainder digit is set to plus one and the binary correction term's zero signal is asserted or if the current signed partial remainder digit is set to plus two and the binary correction term's three signal is asserted.

23. The apparatus as claimed in claim 19 wherein the correction plus PR logic
   asserts the minus two signal if the current signed partial remainder digit is set to minus two and the binary correction term's zero signal is asserted or if the current signed partial remainder digit is set to minus one and the binary correction term's three signal is asserted or if the current signed partial remainder digit is set to zero and the binary correction term's two signal is asserted or if the current signed partial remainder digit is set to plus one and the one signal is asserted or if the current signed partial remainder digit is set to plus two and the binary correction term's zero signal is asserted.

24. The apparatus as claimed in claim 23 wherein the add carry logic
   asserts the sum minus two signal if the minus two signal of the intermediate sum is deasserted and the carry in digit is set to zero;
   asserts the sum minus one signal if the minus two signal of the intermediate sum is deasserted and the carry in digit is set to one or if the minus one of the intermediate sum is asserted and the carry in digit is set to zero;
   asserts the sum zero signal if the minus one signal of the intermediate sum is asserted;
   asserts the sum plus one signal if the intermediate zero signal is deasserted and the carry in digit is set to one or the plus one signal of the intermediate sum is deasserted and the carry in digit is set to zero; and
   asserts the sum plus two signal if the plus one signal of the intermediate sum is deasserted and the carry in digit is set to one.

25. In a computer system, apparatus for performing a square root operation on a radicand, producing a root digit, the apparatus comprising:
   a square unit logic;
   means, within the square root unit for computing the root digit and a binary correction term dependent on a number of digits of a current signed digit partial remainder;

means, within the square root unit for generating a signed digit result by subtracting the binary correction term from the current signed digit partial remainder; and means, within the square root unit for computing a next signed digit partial remainder dependent on the signed digit result.

26. The apparatus as claimed in claim 25 wherein the signed digit partial remainder digits are selected from the set of minus one, zero and one.

27. The apparatus as claimed in claim 26 wherein the number of digits of the current signed digit partial remainder is equal to four.

28. The apparatus as claimed in claim 27 wherein the means for generating a signed digit result computes a carry out independent of a carry in.

29. The apparatus as claimed in claim 28 further comprising means for initializing output signals to predetermined voltage levels.

30. The apparatus as claimed in claim 25 wherein the means for computing a next signed digit partial remainder computes the next signed digit partial remainder by shifting the current signed digit partial remainder signed digit to the left.

31. The apparatus as claimed in claim 25 wherein the signed digit partial remainder digits are selected from the set of minus two, minus one, zero, one and minus two.

32. The apparatus as claimed in claim 31 wherein the number of digits of the current signed digit partial remainder is equal to two.

33. The apparatus as claimed in claim 32 wherein the means for generating a signed digit result computes a carry out independent of a carry in.

34. The apparatus as claimed in claim 33 further comprising means for initializing output signals to predetermined voltage levels.

35. The apparatus as claimed in claim 34 wherein the means for computing a next signed digit partial remainder computes the next signed digit partial remainder by multiplying the current signed digit partial remainder by four.

36. The apparatus as claimed in claim 35 wherein the digits of the signed digit partial remainder are selected from a set comprising more than two digit values.

37. In a computer system, a method for performing a square root operation on a radicand, producing a root digit, comprising the steps of:

computing the root digit and a binary correction term dependent on a number of digits of a current signed digit partial remainder;

generating a signed digit result by subtracting the binary correction term from the current signed digit partial remainder; and computing a next signed digit partial remainder dependent on the signed digit result.

38. The method as claimed in claim 37 wherein the signed digit partial remainder digits are selected from the set of minus one, zero and one.

39. The method as claimed in claim 38 wherein the number of digits of the current signed digit partial remainder is equal to four.

40. The method as claimed in claim 37 wherein the step of generating a signed digit result further comprises the step of computing a carry out independent of a carry in.

41. The method as claimed in claim 40 further comprising the step of initializing output signals to predetermined voltage levels.

42. The method as claimed in claim 37 wherein the step of computing a signed digit partial remainder computes the next signed digit partial remainder by shifting the current signed digit partial remainder signed digit to the left.

43. The method as claimed in claim 37 wherein the signed digit partial remainder digits are selected from the set of minus two, minus one, zero, one and minus two.

44. The method as claimed in claim 43 wherein the number of digits of the current signed digit partial remainder is equal to two.

45. The method as claimed in claim 44 wherein the step of generating a signed digit result further comprises the step of computing a carry out independent of a carry in.

46. The method as claimed in claim 45 further comprising the step of initializing output signals to predetermined voltage levels.

47. The method as claimed in claim 46 wherein the step of computing a next signed digit partial remainder computes the next signed digit partial remainder by multiplying the current signed digit partial remainder by four.

48. The method as claimed in claim 37 wherein the signed digit partial remainder digits are selected from a set comprising more than two digit values.

* * * * *